(12) United States Patent
Soamboonsrup et al.

(10) Patent No.: US 9,756,049 B2
(45) Date of Patent: Sep. 5, 2017

(54) SYSTEM AND METHOD FOR MANAGING SEVERAL MOBILE DEVICES SIMULTANEOUSLY

(71) Applicant: 8303142 CANADA INC., Montreal (CA)

(72) Inventors: Tan Soamboonsrup, Montreal (CA); Jeremy Tan, Montreal (CA); Andrew Lassner, Westmount (CA); Pimnapat Lapassethsiri, Bangkok (TH); Teesid Korsrilabutr, Bangkok (TH); Aran Chananar, Bangkok (TH)

(73) Assignee: 8303142 CANADA INC. (CA)

( * ) Notice: Subject to any disclaimer, the term of this patent is extended or adjusted under 35 U.S.C. 154(b) by 90 days.

(21) Appl. No.: 14/646,797

(22) PCT Filed: Nov. 22, 2013

(86) PCT No.: PCT/CA2013/050894
§ 371 (c)(1),
(2) Date: May 22, 2015

(87) PCT Pub. No.: WO2014/078965
PCT Pub. Date: May 30, 2014

(65) Prior Publication Data
US 2015/0304330 A1     Oct. 22, 2015

Related U.S. Application Data

(60) Provisional application No. 61/791,233, filed on Mar. 15, 2013, provisional application No. 61/729,388, filed on Nov. 22, 2012.

(51) Int. Cl.
*H04L 29/06*       (2006.01)
*G09B 5/08*        (2006.01)
(Continued)

(52) U.S. Cl.
CPC ............... *H04L 63/10* (2013.01); *G09B 5/08* (2013.01); *H04L 67/1002* (2013.01);
(Continued)

(58) Field of Classification Search
CPC combination set(s) only.
See application file for complete search history.

(56) References Cited

U.S. PATENT DOCUMENTS 4,652,240 A   3/1987   Wackym
4,715,818 A   12/1987  Shapiro et al.
(Continued)

FOREIGN PATENT DOCUMENTS

| | | |
|---|---|---|
| CN | 102509482 A | 6/2012 |
| JP | 2007052148 A | 3/2007 |
| JP | 2012127989 A | 7/2012 |

*Primary Examiner* — Taghi Arani
*Assistant Examiner* — Phy Anh Vu
(74) *Attorney, Agent, or Firm* — Gardner Groff Greenwald & Villanueva, PC

(57) ABSTRACT

A learning management system and method. Controllable devices, generally intended for students of a smart classroom, are each operable in a locked configuration and in an unlocked configuration. A controller device, generally intended for a teacher of a smart classroom, is configured to send command signals over a communication network. A server system interprets and handles communications between the controllable devices and the controller device such that when a locking signal is sent from the teacher's controller device, the server system sets each of the controllable devices to the locked configuration in which the user interface of each controllable device is controlled by the controller device, and when an unlocking signal is received from the teacher's controller device, the server system sets each of the controllable devices from the locked configuration to the unlocked configuration in which the user interface is operable independently of the controller device.

20 Claims, 17 Drawing Sheets

(51) Int. Cl.
  *H04W 12/08* (2009.01)
  *H04W 4/00* (2009.01)
  *H04W 4/20* (2009.01)
  *H04L 29/08* (2006.01)
  *H04W 12/06* (2009.01)

(52) U.S. Cl.
  CPC ........... *H04W 4/001* (2013.01); *H04W 4/206* (2013.01); *H04W 12/08* (2013.01); *H04W 12/06* (2013.01)

(56) References Cited

U.S. PATENT DOCUMENTS

| | | | |
|---|---|---|---|
| 4,785,472 A | 11/1988 | Shapiro | |
| 5,872,518 A * | 2/1999 | Kushita | H04W 88/022 340/2.1 |
| 6,041,394 A * | 3/2000 | Halligan | G06F 3/0623 711/114 |
| 6,163,276 A * | 12/2000 | Irving | G08C 17/02 329/307 |
| 6,359,944 B1 * | 3/2002 | Curtis, III | H03J 5/0281 375/326 |
| 6,411,796 B1 | 6/2002 | Remschel | |
| 6,477,558 B1 * | 11/2002 | Irving | G06F 9/4887 718/100 |
| 6,928,260 B2 | 8/2005 | Betz et al. | |
| 7,203,457 B1 * | 4/2007 | Wetzel | H04H 40/90 455/255 |
| 8,358,963 B2 | 1/2013 | Argott | |
| 2004/0191744 A1 | 9/2004 | Guirguis | |
| 2004/0266440 A1 * | 12/2004 | Fuchs | H04L 12/1836 455/445 |
| 2006/0147891 A1 | 7/2006 | Dreyfous et al. | |
| 2007/0196807 A1 * | 8/2007 | Packard | G09B 7/00 434/350 |
| 2009/0133039 A1 * | 5/2009 | Chkodrov | H04L 12/58 719/314 |
| 2010/0267000 A1 | 10/2010 | Crouch | |
| 2011/0225426 A1 * | 9/2011 | Agarwal | H04L 63/10 713/175 |
| 2012/0231434 A1 | 9/2012 | Standage | |
| 2013/0252225 A1 * | 9/2013 | Hayashi | G09B 7/00 434/362 |
| 2014/0280398 A1 * | 9/2014 | Smith | G06F 9/544 707/825 |

\* cited by examiner

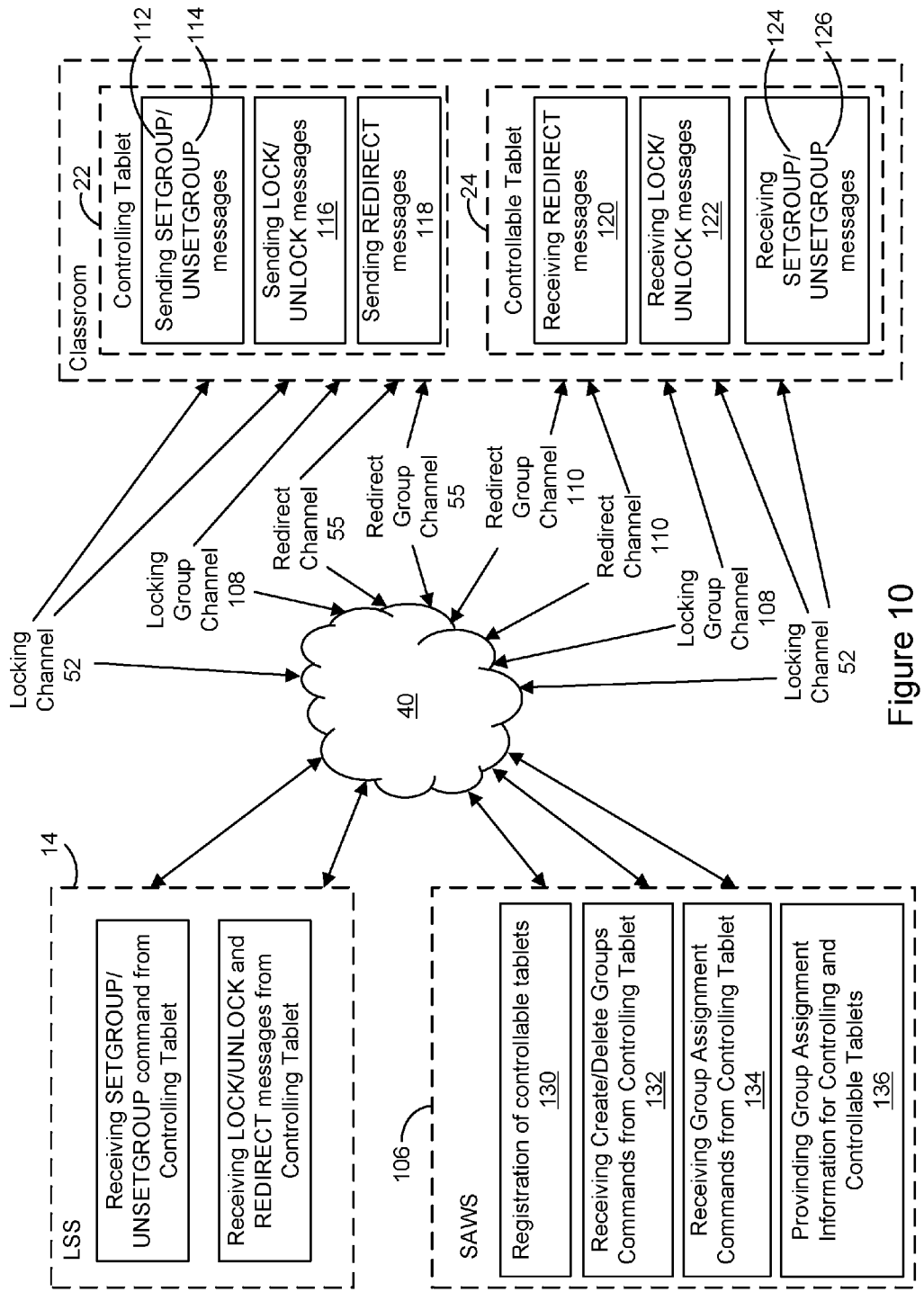

SYSTEM AND METHOD FOR MANAGING SEVERAL MOBILE DEVICES SIMULTANEOUSLY

FIELD OF THE INVENTION

The invention pertains to the field of systems, and methods for mobile devices. The invention more particularly concerns a system and a method for controlling several mobile devices simultaneously.

BACKGROUND OF THE INVENTION

"Smart Classroom" is the term generally used to describe a classroom provided with technological tools such as interconnected servers, laptops, PC's, boards, projectors and the like. In a "Smart Classroom", a teacher is able to transmit/publish a course's content to the students with the use of such tools, instead of relying on traditional chalk or white boards on which teachers sometimes write.

There are several products on the market addressing the needs of "Smart Classrooms", such as interactive white boards, conferencing software, etc. Existing products for "Smart Classrooms" are generally directed to schools in developed countries, in which it is sometimes feasible to install dedicated servers within the school and to provide each student with a laptop or desktop computer.

Unfortunately, existing products are not well adapted for schools in developing countries, which could greatly benefit from the concept of "Smart Classrooms". Indeed, existing software requires a lot of processing capacity which cannot be supported by older computers or by low-cost PCs. In addition, existing solutions generally require having the servers or computers, which manage the content to be displayed on the students' computers, to be physically located within the same room, within the same school, or at least within the same Local Area Network (LAN).

Many of the schools in developing countries have limited resources in terms of computers and/or IT services. They sometimes are not even provided with one computer within the school, and thus it can be difficult to transpose existing "smart classroom" learning tools in schools in these countries.

There is thus a need for a system and/or process which would allow students enrolled in schools with little or no access to technological tools to benefit from the advantages of "smart classrooms". It would also be desirable for such a system to be deployed without requiring expensive servers and/or PC's physically located in the schools. It would also be desirable for teachers to be able to create and manage learning content easily, and to be able to control this content when displayed to their students.

Known to the Applicant are U.S. Pat. No. 4,652,240 (WACKYM); U.S. Pat. No. 4,715,818 (SHAPIRO et al.); U.S. Pat. No. 4,785,472 (SHAPIRO); U.S. Pat. No. 6,411,796 B1 (REMSCHEL); U.S. Pat. No. 6,928,260 B2 (BETZ et al.); U.S. Pat. No. 8,358,963 B2 (ARGOTT); and United States Patent Applications published under Nos.: 2004/0191744 A1 (GUIRGUIS); 2006/0147891 A1 (DREYFOUS et al.); 2010/0267000 A1 (CROUCH); 2012/0231434 A1 (STANDAGE); as well as Japanese Patent Applications published under Nos.: 2007052148 A (NOMOTO) and 2012127989 A (HAYASHI et al.). However, these documents suffer from drawbacks as will be better understood in light of the foregoing description.

Hence, there is a need for an improved system which, by virtue of its design and components, would be able to overcome some of the above-discussed prior art concerns.

SUMMARY OF THE INVENTION

It is an object of the present invention to respond to at least one of those above-mentioned needs.

In accordance with an aspect of the present, there is provided a learning management system. The learning management system comprises controllable devices, each having a user interface, a processor for processing input commands received at the user interface, and a communication port for communicating via a communication network, each controllable device being operable in a locked configuration and in an unlocked configuration. The learning management system further comprises a controller device having a communication port for sending locking and unlocking command signals via the communication network. The learning management system further comprises a server system for interpreting and handling communications between the controllable devices and the controller device, in order to: receive the locking command signal from the controller device, and send in response thereto, a corresponding locking control signal to operate each of the controllable devices simultaneously in said locked configuration wherein the user interface of the controllable device is controlled by the controller device, and receive the unlocking command signal from the controller device, and send in response thereto, a corresponding unlocking control signal to operate each of the controllable devices from said locked configuration to the unlocked configuration wherein the user interface is operable independently of the controller device.

In accordance with another aspect of the present, there is provided a method of operating a learning management system comprising: (a) receiving, at a server system, a locking command signal from a controller device; and (b) processing, at the server system, the locking command signal and sending a corresponding locking control signal to controllable devices in order to simultaneously operate each of the controllable devices in said locked configuration wherein a user interface of each controllable device is controlled by the controller device.

In accordance with yet another aspect of the present, there is provided a non-transitory storage medium comprising processor-readable data and instructions for receiving, at a server system, a locking command signal from a controller device, for processing the locking command signal and for sending a corresponding locking control signal to controllable devices in order to operate simultaneously each of the controllable devices in said locked configuration wherein a user interface of each controllable device is controlled by the controller device.

Advantageously, the present invention allows for providing a learning management system and method which can be implemented in classrooms without having to install a server within the school, and without having to use expensive computers. Simple, low-cost touchscreen tablets can be used instead of desktop or laptops. The system also advantageously allows the teacher to manage the learning content to be displayed on the controllable tablets of his/her students. The system also allows for managing/controlling several tablets simultaneously. For example, a controlling device can allow for locking and/or displaying the same content on some or all of the controllable tablets.

Advantageously, the server system interprets the controller device's command signal, when the controller devices are in a locked mode of operation to control for example, the learning content to be presented on the controller devices' display screens and/or the user controls that are permitted by the students within this learning content.

BRIEF DESCRIPTION OF THE DRAWINGS

The present invention and its advantages will be better understood and apparent upon reading the following detailed description made with reference to the accompanying drawings wherein:

FIG. 10 is a block diagram of the subgrouping feature, according to an embodiment of the invention.

Figure 1A:
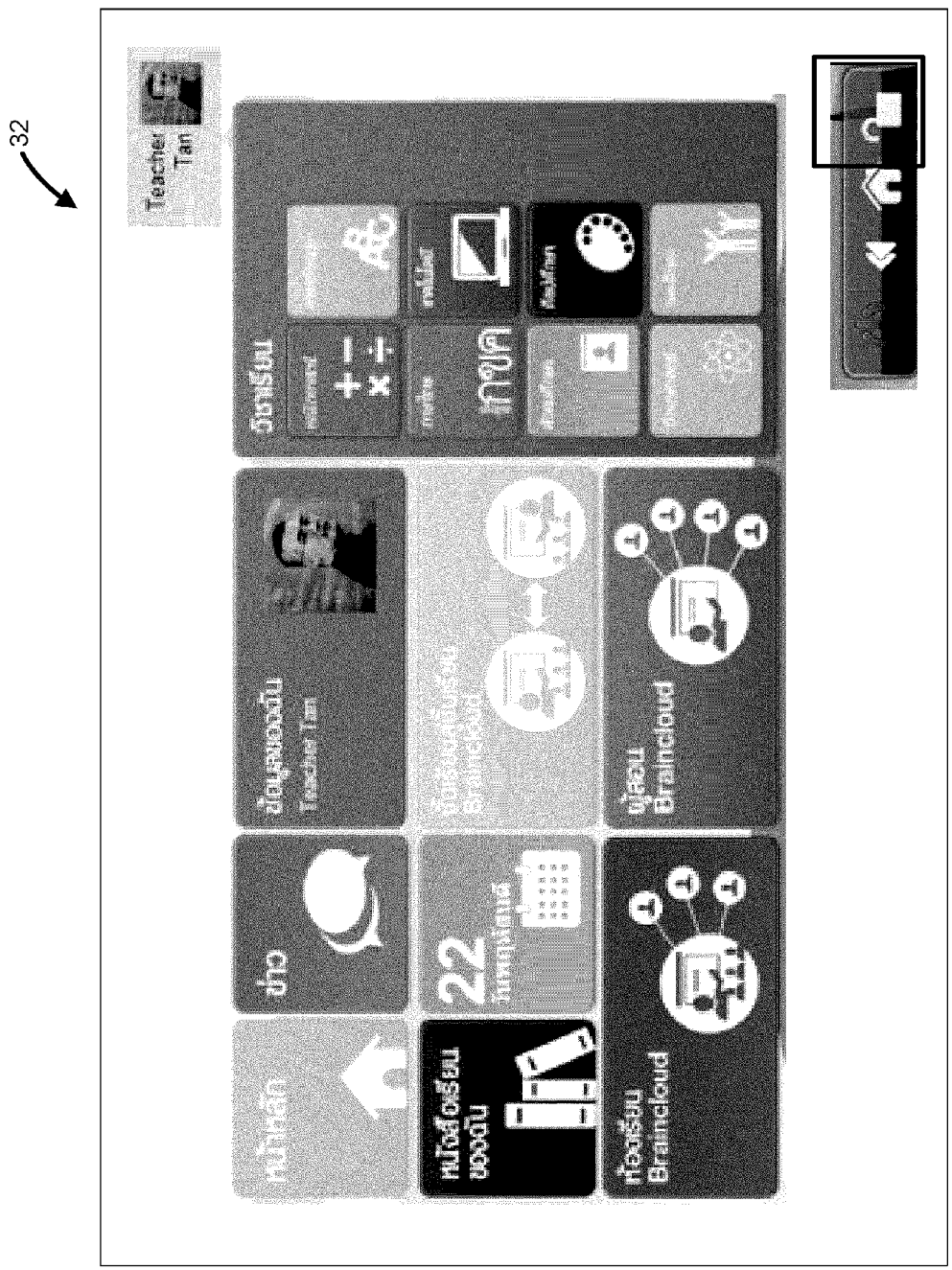
FIGS. 1A to 1C show different screen captures of a controlling device interface.

While the invention will be described in conjunction with exemplified embodiments, it will be understood that these embodiments are not intended to limit the scope of the invention to such embodiments. On the contrary, the present invention is intended to cover all alternatives, modifications and equivalents as may be included as defined by the appended claims.

DESCRIPTION OF PREFERRED EMBODIMENTS

In the following description, similar features in the drawings have been given similar reference numerals. To preserve the clarity of the drawings, some reference numerals may have been omitted if they were already identified in a preceding figure.

In one embodiment of the invention, the tablet controlling system is an integrated learning management system for tablet computers that combines learning content management, video conferencing, and tablet management functionality into a single, easy to use software platform. By software platform, it is meant the software located on remote servers, which allows for managing learning content, user access, user data, etc. In some embodiment, the software platform can also include applications stored on the tablets.

The software platform can run on a single server, but preferably runs on cloud-based clustered servers. The software platform can be accessed remotely by touchscreen computer tablets, but also by PCs, laptops, smartphones and the like.

Referring to FIGS. 1A-1H and FIG. 2, according to a preferred embodiment, the system is a Learning Management System which comprises an Administrative Interface, referred to hereafter as the "Admin Interface", accessible from the web, and an LMS Web service, allowing access to authentication rights management and content using RESTful technologies. The system also comprises a Locking and Synchronization Server (LSS) for controlling locking and synchronization functions between a controlling device (i.e. the teacher's) and several controllable tablets (i.e. the students'). Preferably, the controllable tablets are Thai One-Tablet-Per-Child (OTPC) tablet, having stored therein a tablet application, such as the Braincloud Tablet application. The system also comprises a web-accessible version of the tablet application, which can be accessed with any type of device, such as laptops, desktops, or tablets.

The software platform offers several advantages over other existing platforms, some of which are explained below. Indeed, the software platform is easy to use, and is especially adapted for K-12 education purposes.

The software platform includes an easy to use interface, which may be operated by elementary school students for example. The software platform also includes a user interface which supports swipe and touch tablet gestures for selecting functions. It also comprises interconnecting functions allowing for the display of content from external sources, such as school news and/or ministry news. The software platform also includes student profile functions and is able to store and access student data, student awards, and grades. The software platform can also include a student calendar function, as well as functionalities allowing for the inclusion of third party applications and web links.

A course material function allows teachers to update course content to be viewed on students' and/or the teacher's tablets. Another function, the course content management function, allows teachers to directly update course content onto the tablet, via the clustered servers.

Preferably, the platform also includes a quiz functionality allowing teachers to create quizzes and/or tests that can be used on the tablets. Still preferably, the platform may include classroom connectivity functions, allowing video conferencing so as to permit students using tablet computers to remotely access a physically separate classroom via video conference that has been suitably equipped.

Still preferably, the video conferencing system permits students to access tutors for either one-on-one learning sessions or one-to-many learning sessions provided by tutors and teachers.

The platform management function allows teachers to control many tablets in a classroom setting. Teachers are able to lock, ie prevent students from using their tablets and teachers are able to send information and content to the tablets. Optionally, the platform also includes a function allowing reporting to an external organization, such as the Ministry of Education for example.

Optionally, the platform can include or support a "Points and Rewards" system for education. The "Points and Rewards" system can be included or separate from the platform, but accessible through it. Such an application allows students to collect points while performing tasks on the tablet computer such as reading content and completing quizzes. Students earn points which can then be exchanged for rewards donated by corporations, NGOs, or other organisations.

Figure 2:
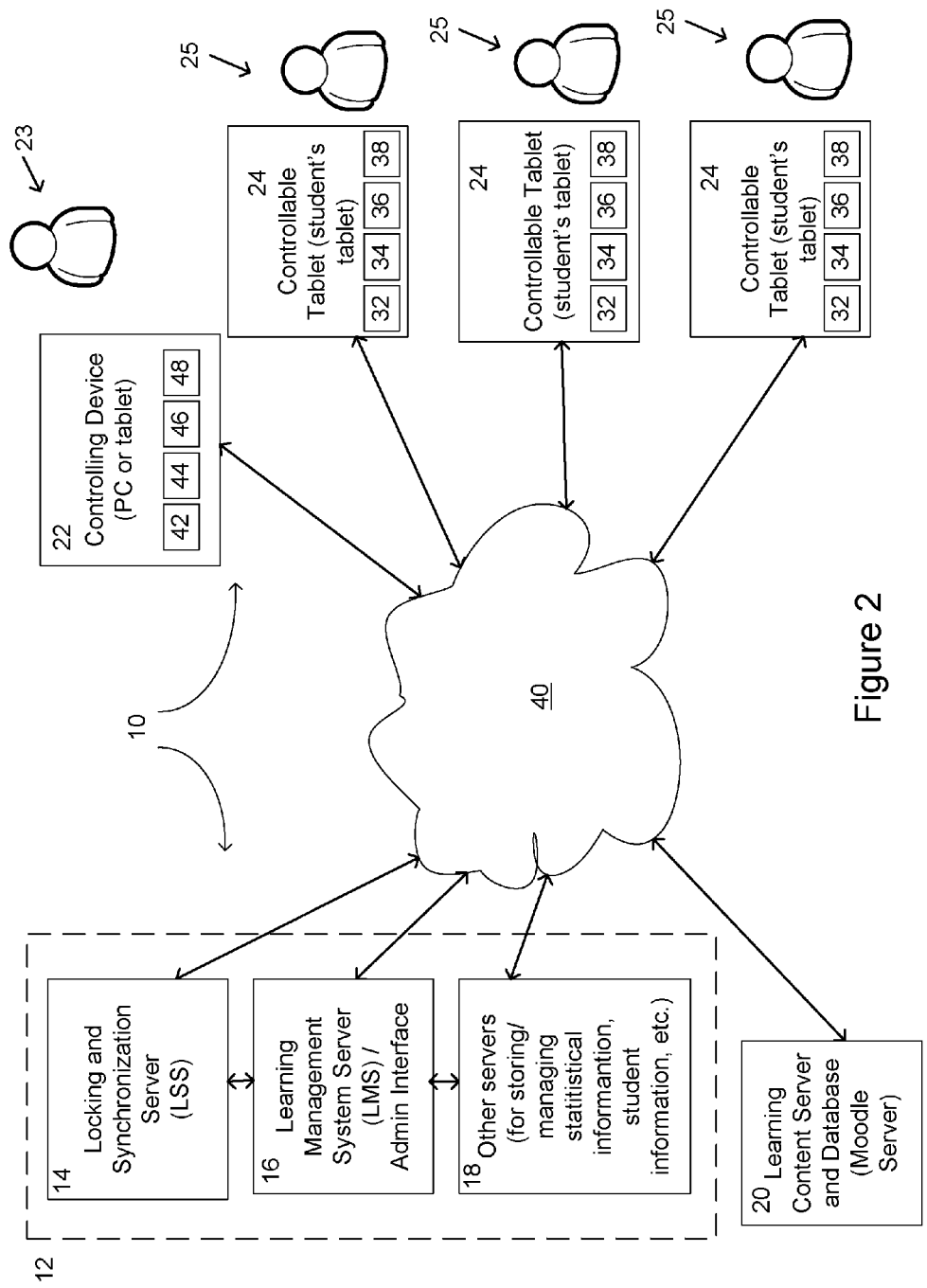
FIG. 2 is a schematic representation of a learning management system, according to an embodiment of the invention, within its environment.

Referring now to FIG. 2, the internet "Cloud" Server based tablet management system 10 is a client-server system, with several servers 14, 16, 18 providing services for different application functions.

The system 10 includes a Learning Management System (LMS) server 16. The LMS server includes functions to authenticate and provide remote access to the controller 22, and controllable tablets 24. Preferably, the LMS server 16 includes a RESTful web service for authentication and for facilitating remote access to educational content by tablets running the tablet application.

The system 10 also includes a Locking and Synchronization Server (LSS) 14, including a function for locking/unlocking and syncing student tablets by teachers. Preferably, this function uses a variant protocol based on Comet optimized for single-publisher, multiple-subscriber message origination and transfer. The LSS server 14 authenticates with the LMS server 16 web service for security to ensure that locking messages are sent from authorized sources. An example of an authorized source is the teacher's controlling device 22, or any other authorized device.

Once the authenticating process has succeeded, several functions can be accessed by the controlling device 22, three of which are a) a lock/unlock function, b) a browse course information and content function, and c) a synch information and content function.

Each of the functional features of the system will be described below, in accordance with an exemplary embodiment, with reference to FIGS. 3 to 5, and in accordance with an alternate embodiment, with reference to FIGS. 6 to 8.

Lock/Unlock Function

In one example of the lock/unlock function's use, each student attending the class of the teacher has their own tablet computer. Locally installed on the student tablet is an operating system platform, such as Android or iOS for example, along with an application adapted to communicate with the remote clustered servers. In some embodiments, the student tablet can have an application for communicating directly with the teacher's controlling device (PC or tablet).

The application includes several functions, including a lock/unlock function which is activated by the controlling device of the teacher, via the remote servers. Upon the teacher pressing the "lock" function on either one of a PC, laptop or tablet, all functions including the touch interface and all buttons on the student tablets will be "locked", thereby preventing the students from accessing anything on the tablet. The teacher has taken control of the tablet at this point.

Figure 3:
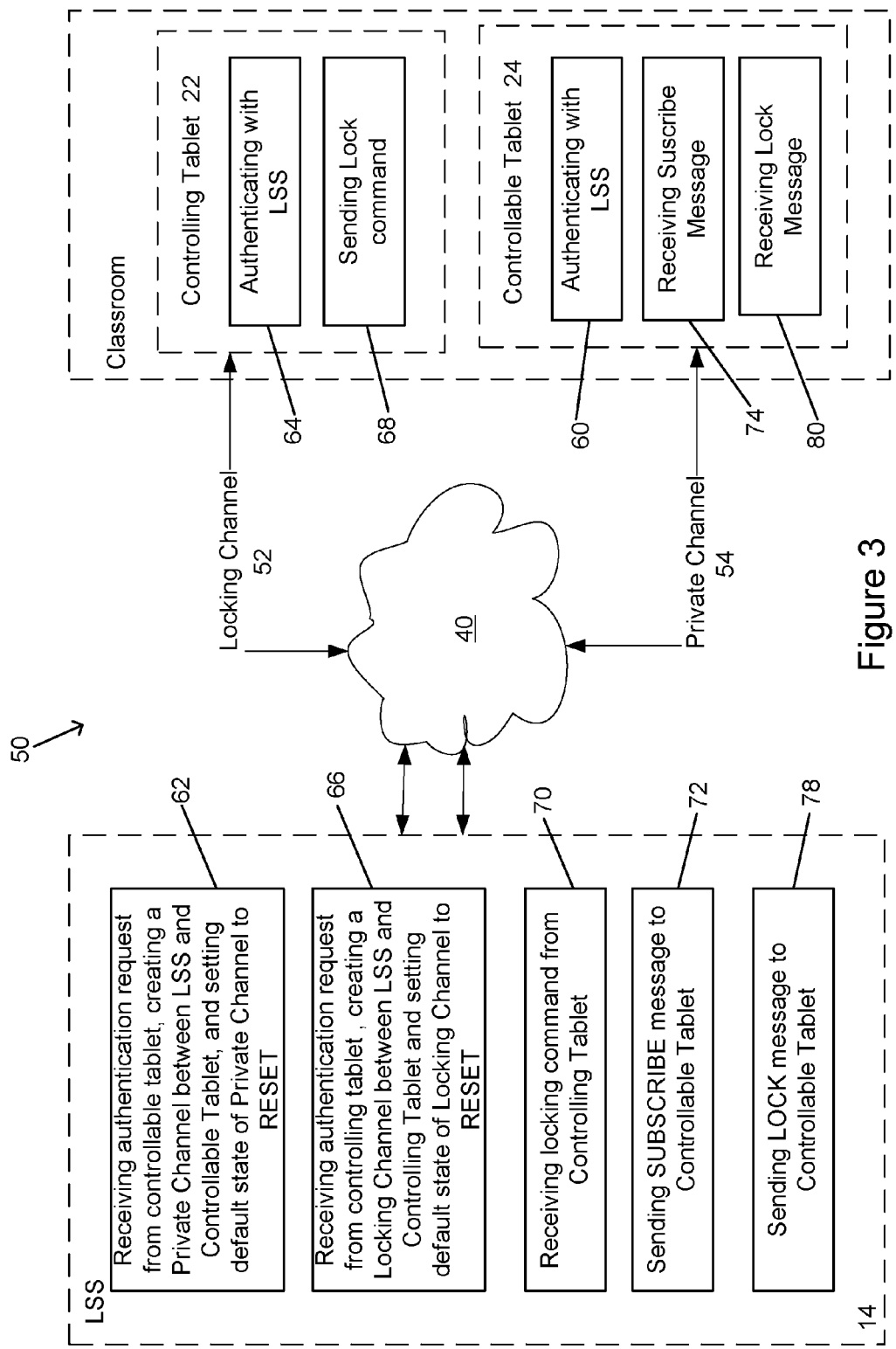
FIG. 3 is a block diagram of the authenticating and locking process, according to a first embodiment of the invention.

Referring now to FIG. 3, messages can be transmitted using a variant Comet protocol that utilizes server-push technology to publish single-publisher multiple-listener messages in a lightweight manner. In order to be authenticated as a controllable/student tablet by the platform 12, each tablet 24 may connect to the LSS server 14 so as to subscribe to messages directed at the student, sent via a Private Channel.

Each controlling device 22 authenticates as a controlling/teacher tablet checks a Locking Channel associated with his or her class to determine the current locking state.

The default state of each Private Channel and Locking Channel is a RESET message, which persists when there is no other active message on the channel. Active messages are those sent by message publishers (in this case, teachers) and persists on the channel for a configurable timeout period. Once an active message has been timed out, a RESET message is sent on that channel to reset all subscribers to their default states.

When a locking command is sent from the controlling device, i.e. when a teacher presses the lock button for his or her class, a SUBSCRIBE message is sent by the server to each student's private channel, thereby forcing each students' tablet application to subscribe to the locking channel of the class. The SUBSCRIBE message persists on all private channels for a configurable timeout period.

Once the controlling device 22, via the server 14, has forced all students to subscribe to the locking channel, a LOCK message is pushed by the server 14 on that locking channel to all subscribed students.

Once a student tablet receives a LOCK message, the tablet 24 acknowledges the message, changes display elements in the user interface to indicate that the application is being locked, and disables all input handling of the tablet platform.

Controllable tablets 24 are unlocked when they receive an UNLOCK command from the server 14, which is triggered by a controlling device 22. A RESET command can also unlock the controllable tablets.

Figure 6:
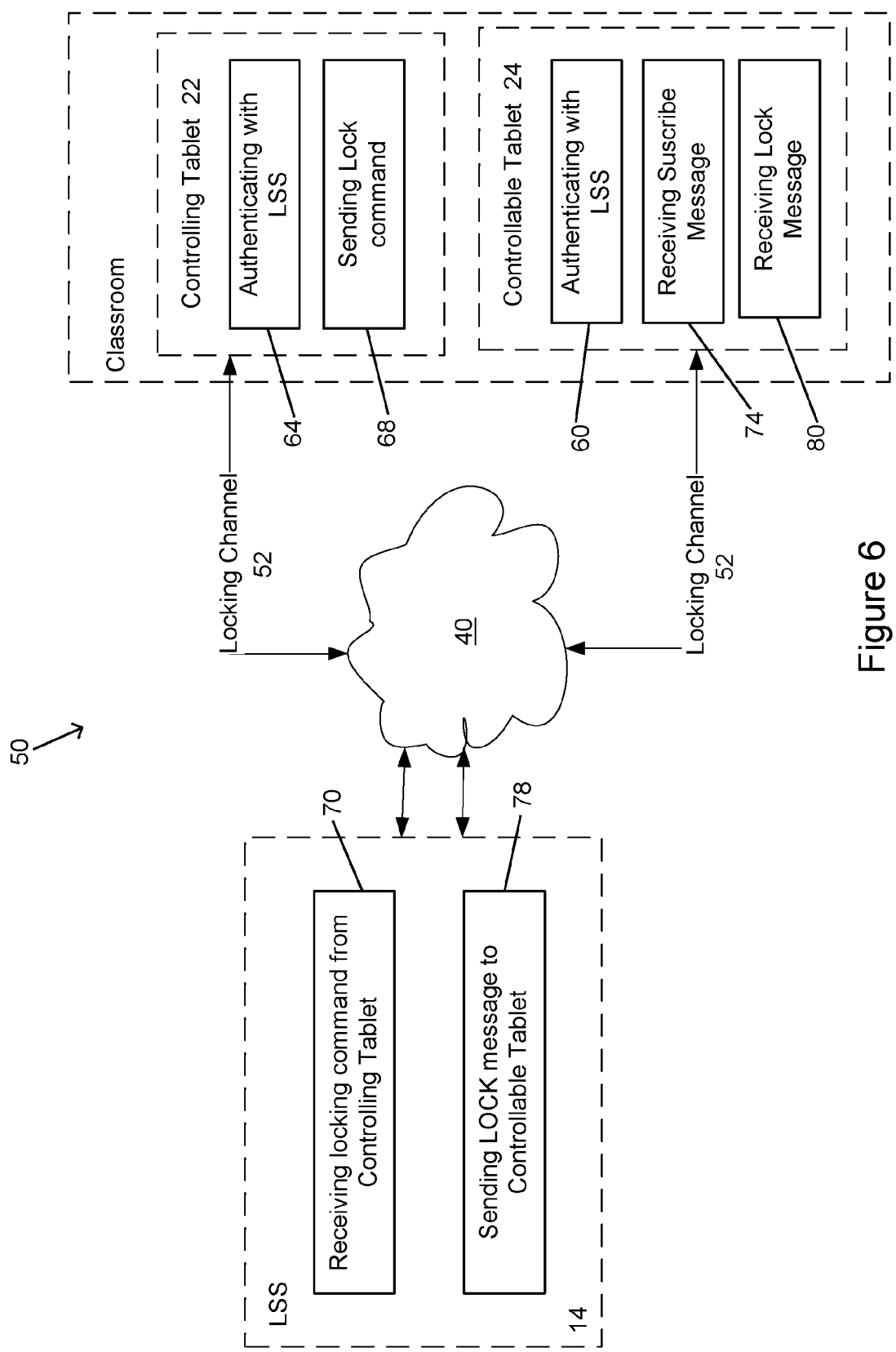
FIG. 6 is a block diagram of the authenticating and locking process, according to a second embodiment of the invention.

In the alternate embodiment shown in FIG. 6, each tablet 24 connects to the LSS server 14 so as to subscribe to messages directed at the student's class, sent via the Locking Channel 52.

Each controlling device 22 authenticates as a controlling/teacher tablet checks a Locking Channel associated with his or her class to determine the current locking state.

The default state of each Locking Channel 52 is a RESET message, which persists when there is no other active message on the channel. Active messages are those sent by message publishers (in this case, teachers) and persists on the channel for a configurable timeout period. Once an active message has been timed out, a RESET message is sent on that channel to reset all subscribers to their default states.

The controlling device 22, pushes a LOCK message via the server 14 on that Locking Channel 52 to all subscribed students, thereby locking the interfaces of the controllable tablets 24, for students of a given class.

Once a student tablet receives a LOCK message, the tablet 24 acknowledges the message, changes display elements in the user interface to indicate that the application is being locked, and disables all input handling of the tablet platform.

Controllable tablets 24 are unlocked when they receive an UNLOCK command from the server 14, which is triggered by a controlling device 22. A RESET command can also unlock the controllable tablets.

FIG. 1A shows the home page accessible on the controlling device 22, for the teacher. This interface includes several navigation tools, at the bottom right of the interface, including a notification of the current locking state of the teacher's locking channel. In this case, the locking state is "unlock". FIG. 1D shows a student home screen in an unlocked state. The navigation tools are different than those of the controlling device.

Figure 1B:
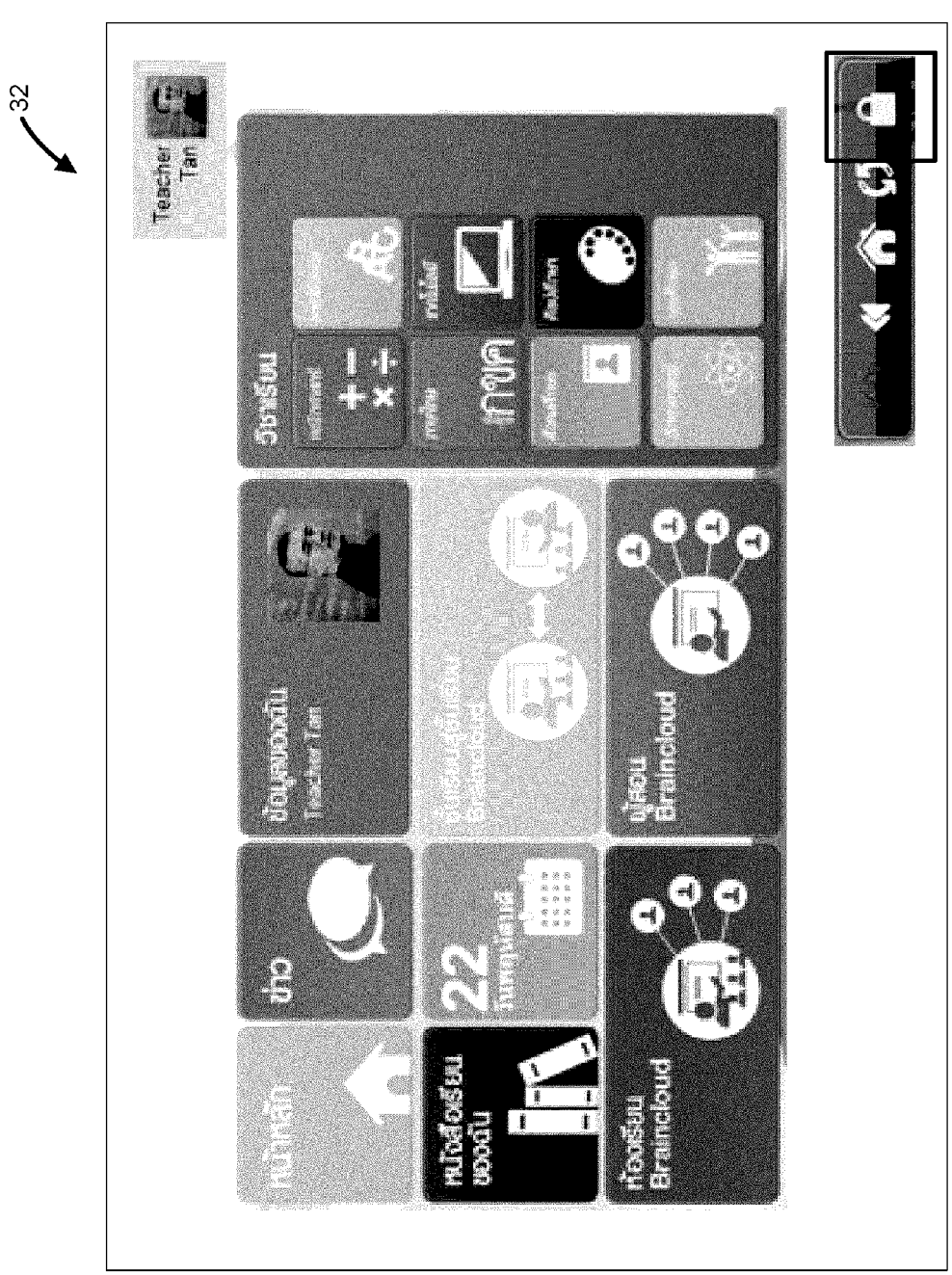

Referring to FIG. 1B, when the teacher presses the "lock" button, the Lock notification changes to the locked state, and the synchronize button appears. As shown in FIG. 1E, when the teacher presses the lock button, a student in that teacher's locking channel will receive a notification that his or her tablet is now locked. A large lock icon is displayed for a few seconds before disappearing. As shown in FIG. 1F, after the lock notification disappears, the student's navigation icons will show only a button displaying the locked state of the tablet.

Browse Course Information and Content

Teachers are able to browse course content via their controlling device 22 (desktop, laptop, or tablet), by accessing the Learning Management System server 16, while student tablets 24 are in locked mode. The LMS server 16 preferably includes an Administration interface which allows interacting with the content stored on an external server, such as a Moodle server 20. Accessing the course content can be done via an application installed on the tablet, or via a web-browser. In other words, teachers are able to browse content, via their tablets 24, within a web browser contained within the learning management system.

The teacher is able to access the learning management system (LMS) using any web browser. The teacher accesses the LMS through the "Admin Interface", which is a web-accessible interface to the LMS server.

Alternatively, teachers can access course content from the clustered servers 12 using a web browser from a desktop or desktop computer, as long as the device has been authenticated as a controlling/teacher's device.

As shown in FIG. 2, the course material and content is located within the online "cloud" LMS server 16 and stored within a database 20. The course content is preferably rendered on the teacher's device as a webpage. Preferably, it is possible to browse external Internet websites via the LMS server 16.

All content is rendered according to the templates and methods of input using the learning management system. Preferably, formatting and rendering of the data and templates are predefined, using HTML, but of course, other languages can be considered.

Figure 1C:
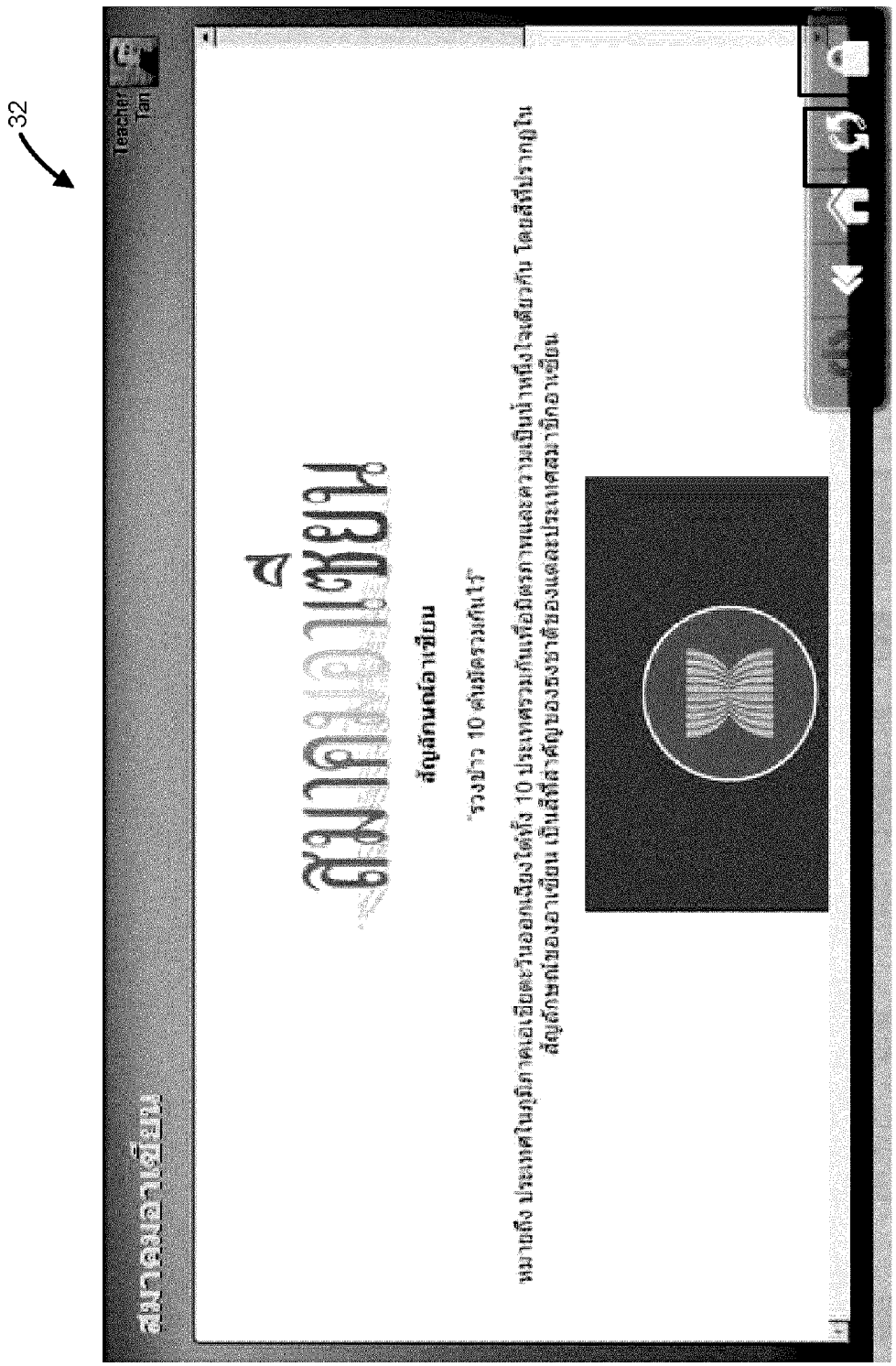
Figure 1D:
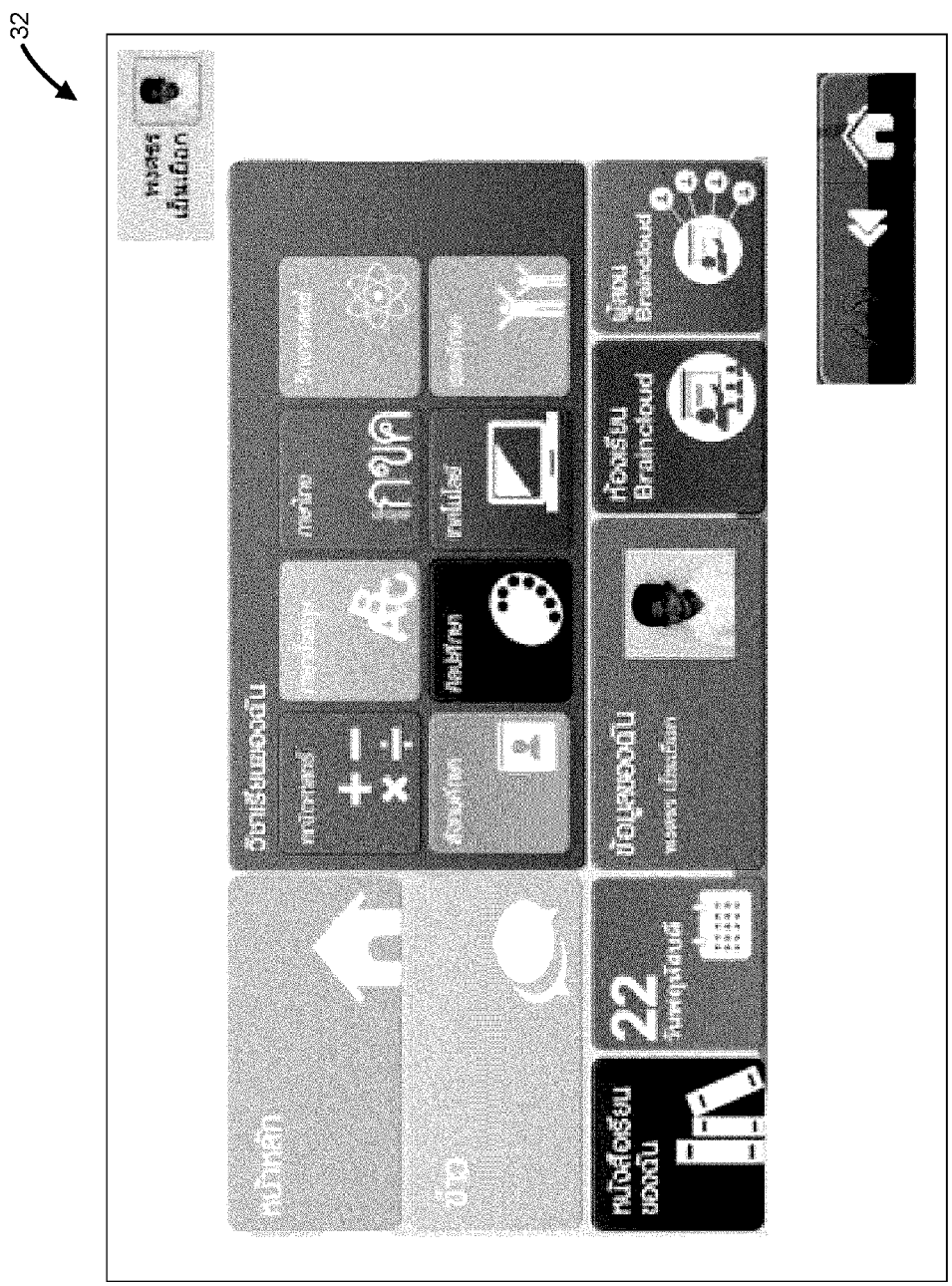
FIGS. 1D to 1H show different screen captures of a controllable tablet interface.
Figure 1E:
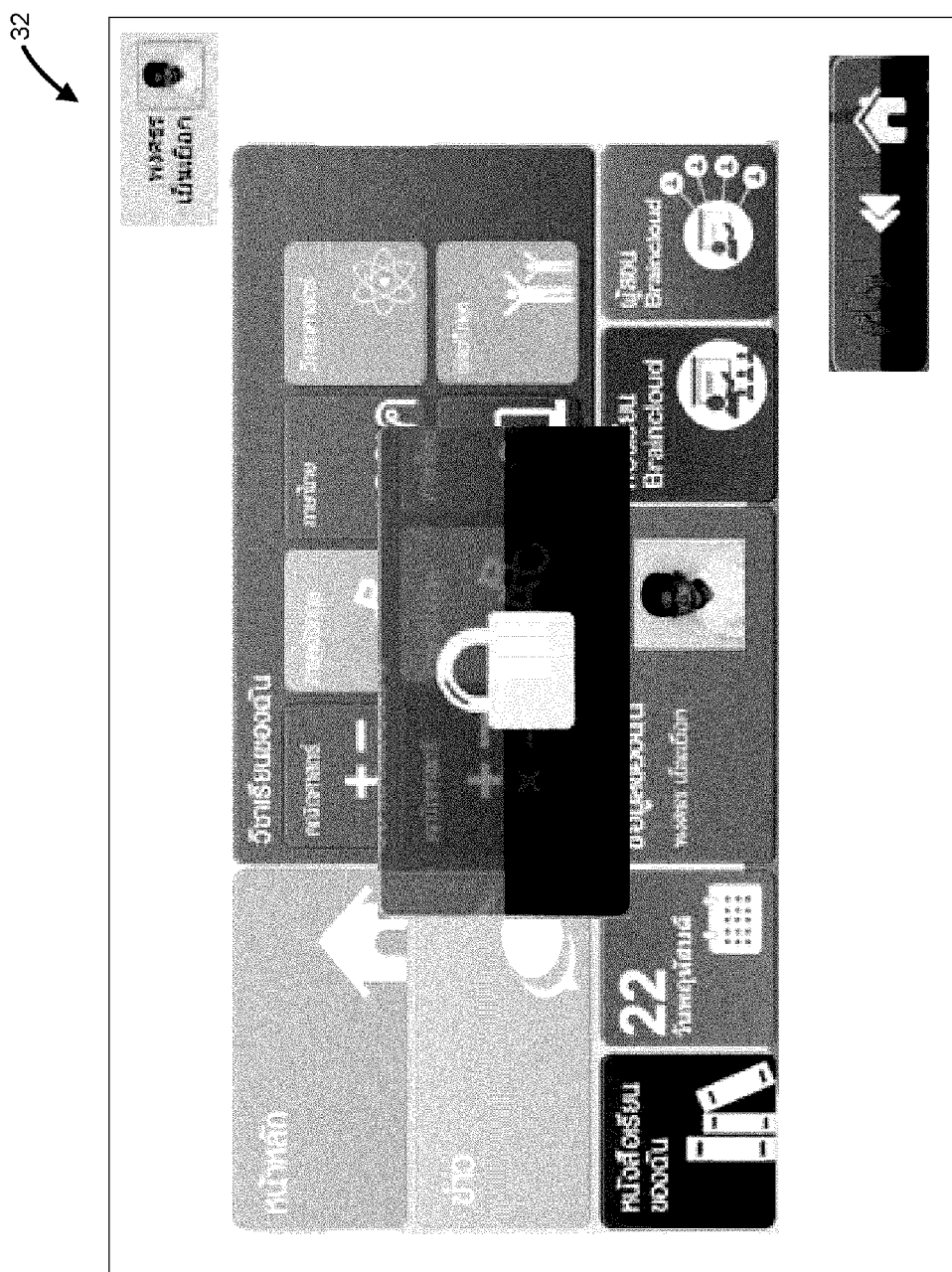
Figure 1F:
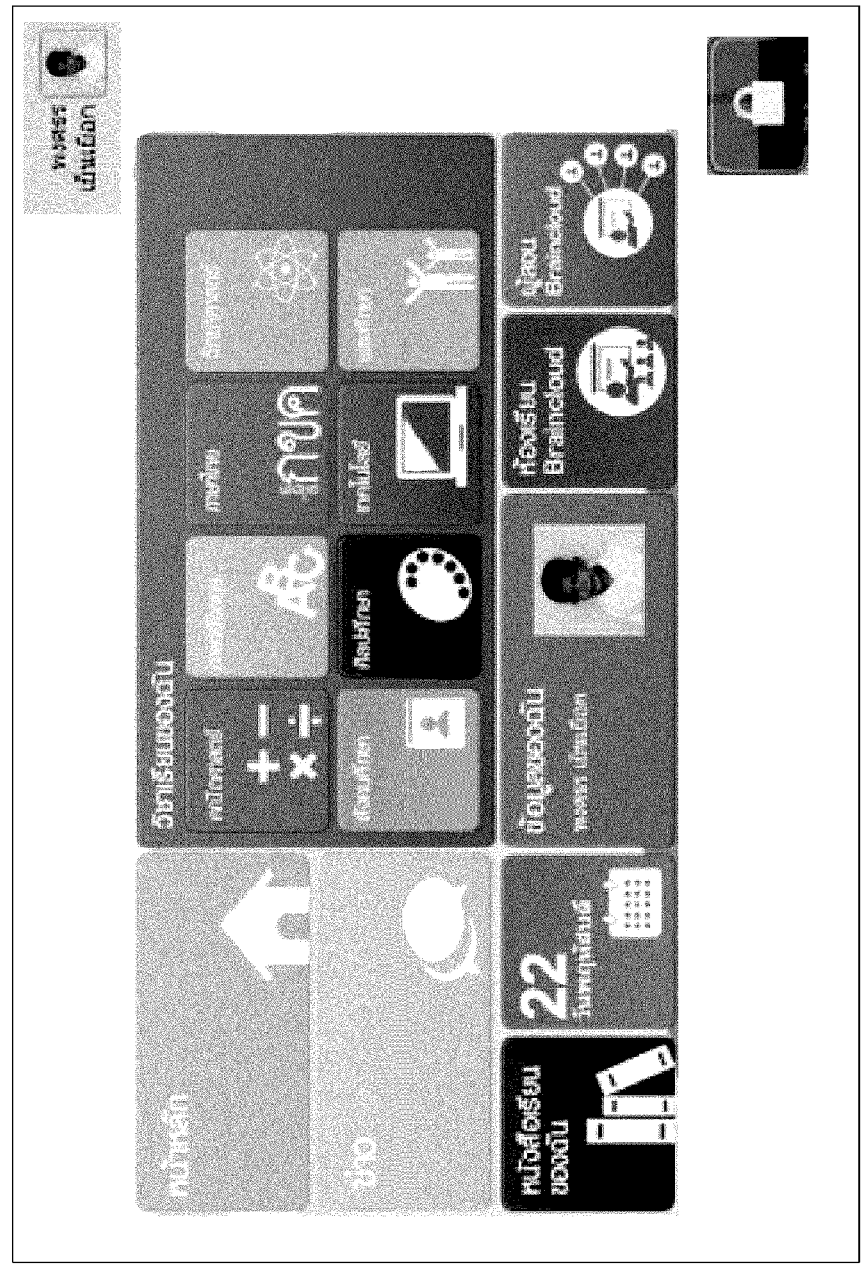

Referring to FIG. 1C, a teacher can continue to browse the application, or browse through the web-based version of the application, while his or her locking channel is in the locked state. Once a teacher has selected content that should be displayed on the student's tablet, he or she can click the synchronize button, as it will be explained more in detail below.

Synch Information and Content

The system 10 can also allow the controlling devices 22 of teachers, once they have browsed to either course content or websites they wish to display on the student tablets, to synchronize with the students' tablets 24 by pressing a "synchronize" button (on the tablet application—if using a tablet, or via the web-based application control panel—if using a laptop) to force all the student tablets 24 that they have previously locked to load the synchronized content. Once synchronized, the controllable tablet will allow scrolling of the content of the tablet application, but will prevent any navigation away from the content.

Figure 4:
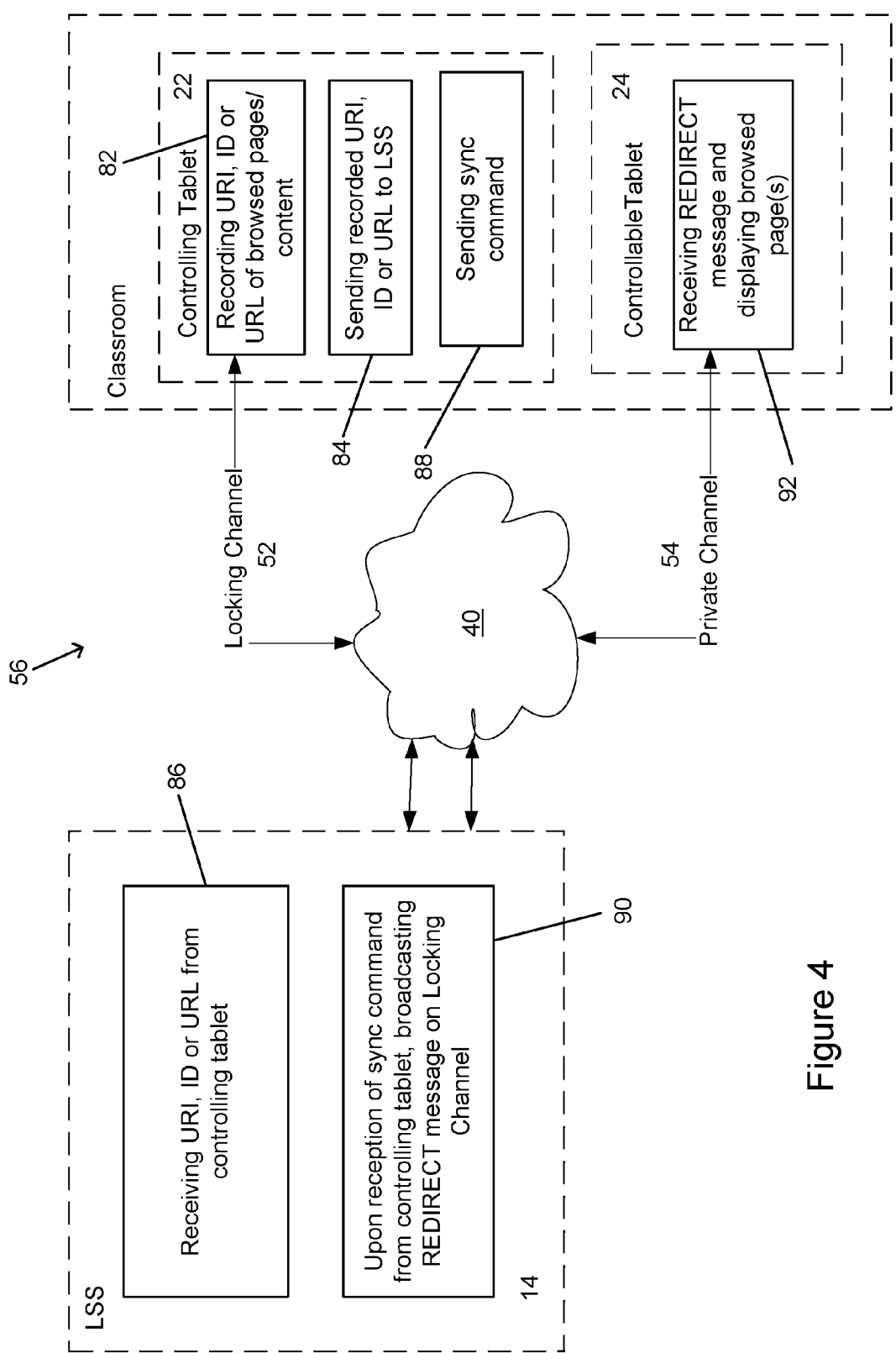
FIG. 4 is a block diagram of the synchronization process, according to the first embodiment of the invention.

Turning now to FIG. 4, the controlling device (via either one of the Braincloud Tablet application or the Braincloud-on-the-Web) will know which content or web page the teacher has browsed by recording the page URI, content ID, or website URL selected by the teacher.

When the teacher clicks on the synchronize button on his or her control panel, a REDIRECT message will be sent to the teacher's class Locking Channel with the URI, content ID, or URL as the REDIRECT argument.

The LSS server 14 will broadcast that message on the Locking Channel via a server push message to all student tablets 24 subscribing to that Locking Channel. Tablets 24 which receive a REDIRECT message and which are in a locked state will redirect the tablet view to the page URI, content ID, or website URL as specified in the message argument.

The teacher may broadcast as many REDIRECT messages using the sync button as necessary during a locked session to his or her class' Locking Channel while the channel state is locked.

Figure 1G:
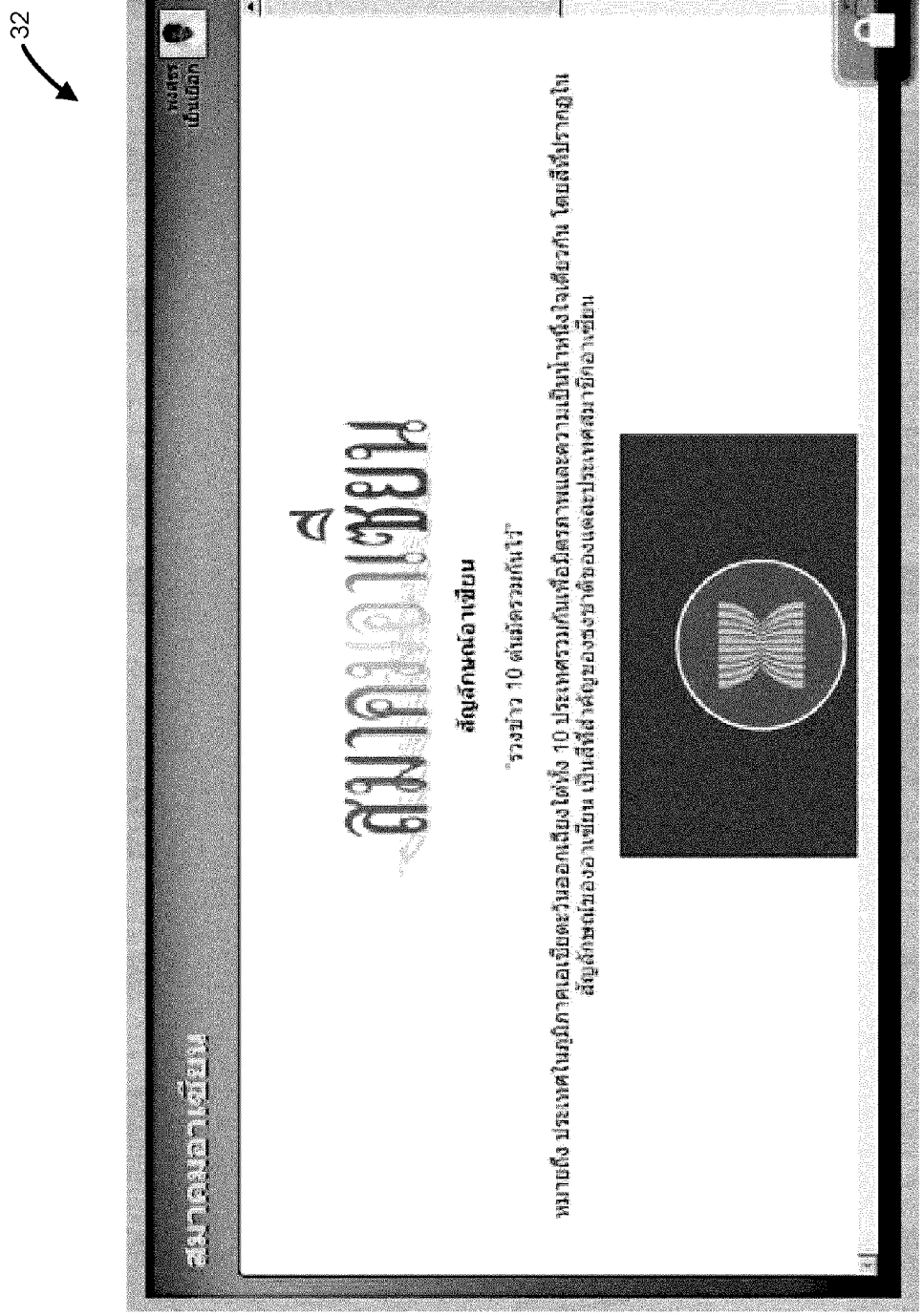
Figure 1H:

Referring to FIG. 1G, while in the locked state on a teacher's locking channel, a student's tablet receiving a synchronized message will immediately show the content that the teacher has synced to. The student still cannot navigate or browse, but is able to scroll the content. Once the teacher unlocks the tablets, the students are able to browse any particular course content. As shown in FIG. 1H, the student's tablet is in the unlocked state (the lock button at the bottom right of the screen has disappeared) and he/she is able to browse any content or web page available from the application.

Figure 7:
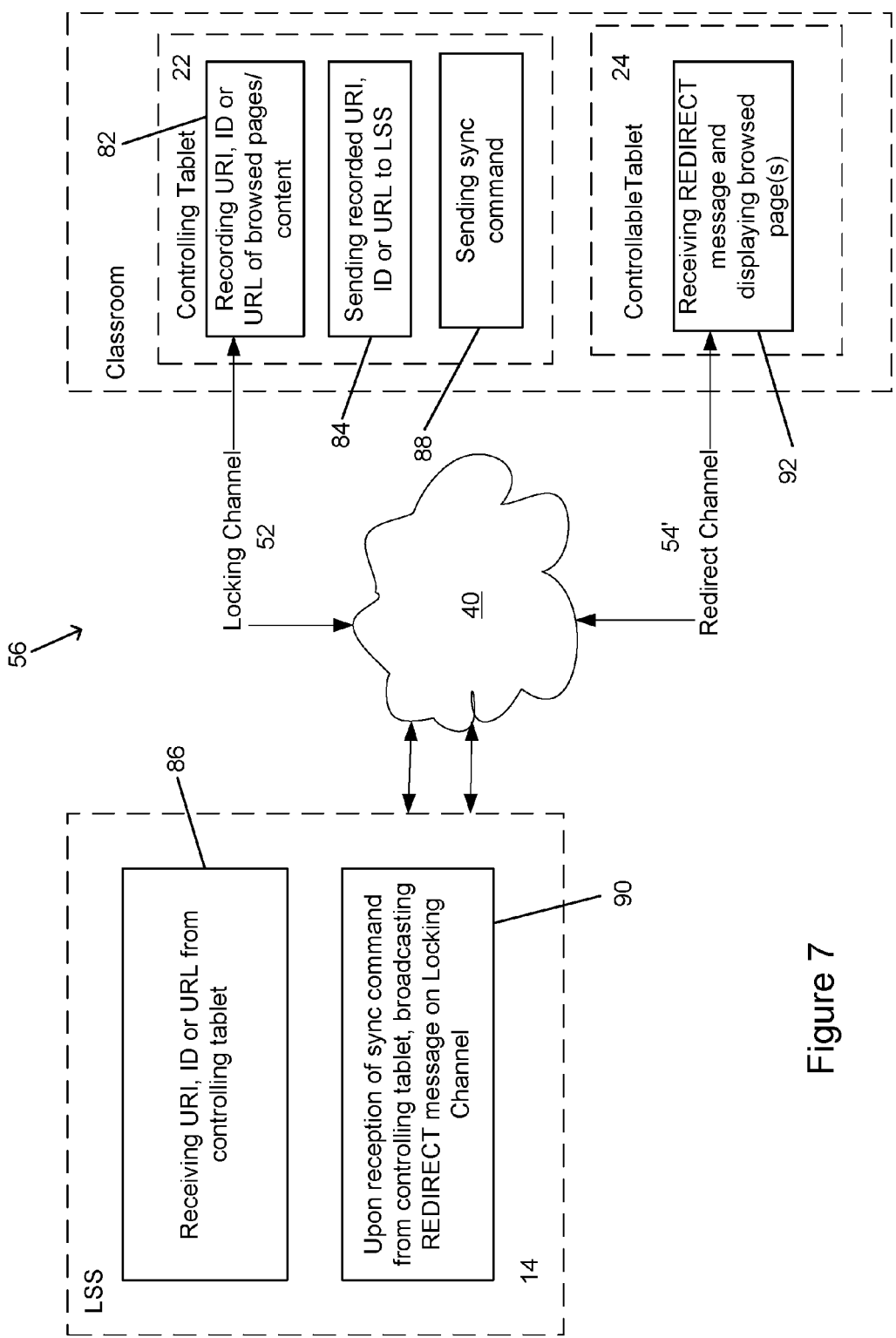
FIG. 7 is a block diagram of the synchronization process, according to the second embodiment of the invention.

In accordance with the alternate embodiment shown in FIG. 7, the controlling device will know which content or web page the teacher has browsed by recording the page URI, content ID, or website URL selected by the teacher (via either one of the Braincloud Tablet application or the Braincloud-on-the-Web). The controlling device will also know the current viewport position of the content as it is being viewed by the teacher.

When the teacher clicks on the synchronize button on his or her control panel, a REDIRECT message will be sent to a Redirect Channel 55 of teacher's class, with the URI, content ID, or URL, and the current viewport position of the content, as the REDIRECT argument.

The LSS server 14 will broadcast that message on the Redirect Channel 55 via a server push message to all student tablets 24 subscribing to that Redirect Channel 55. Tablets 24 which receive a REDIRECT message and which are in a locked state will redirect the tablet view to the page URI, content ID, or website URL, and position the viewport of the student tablet in the exact position of the teacher's view, as specified in the message argument.

The teacher may broadcast as many REDIRECT messages using the sync button as necessary during a locked session to his or her class' Redirect Channel 55 while the channel state is locked.

While in the locked state on a teacher's locking channel, a student's tablet receiving a first synchronized message to a particular piece of content will immediately show the content that the teacher has synced to (see FIG. 1G). The student still cannot navigate or browse, but is able to scroll the content. Any subsequent REDIRECT messages to the same piece of content which repositions the viewport according to the viewport position of the teacher, will disallow scrolling of the content by the student for a certain period of time. Once the teacher unlocks the tablets, the students are able to browse any particular course content. As shown in FIG. 1H, the student's tablet is in the unlocked state (the lock button at the bottom right of the screen has disappeared) and he/she is able to browse any content or web page available from the application.

Subgrouping Assignment

Figure 9:
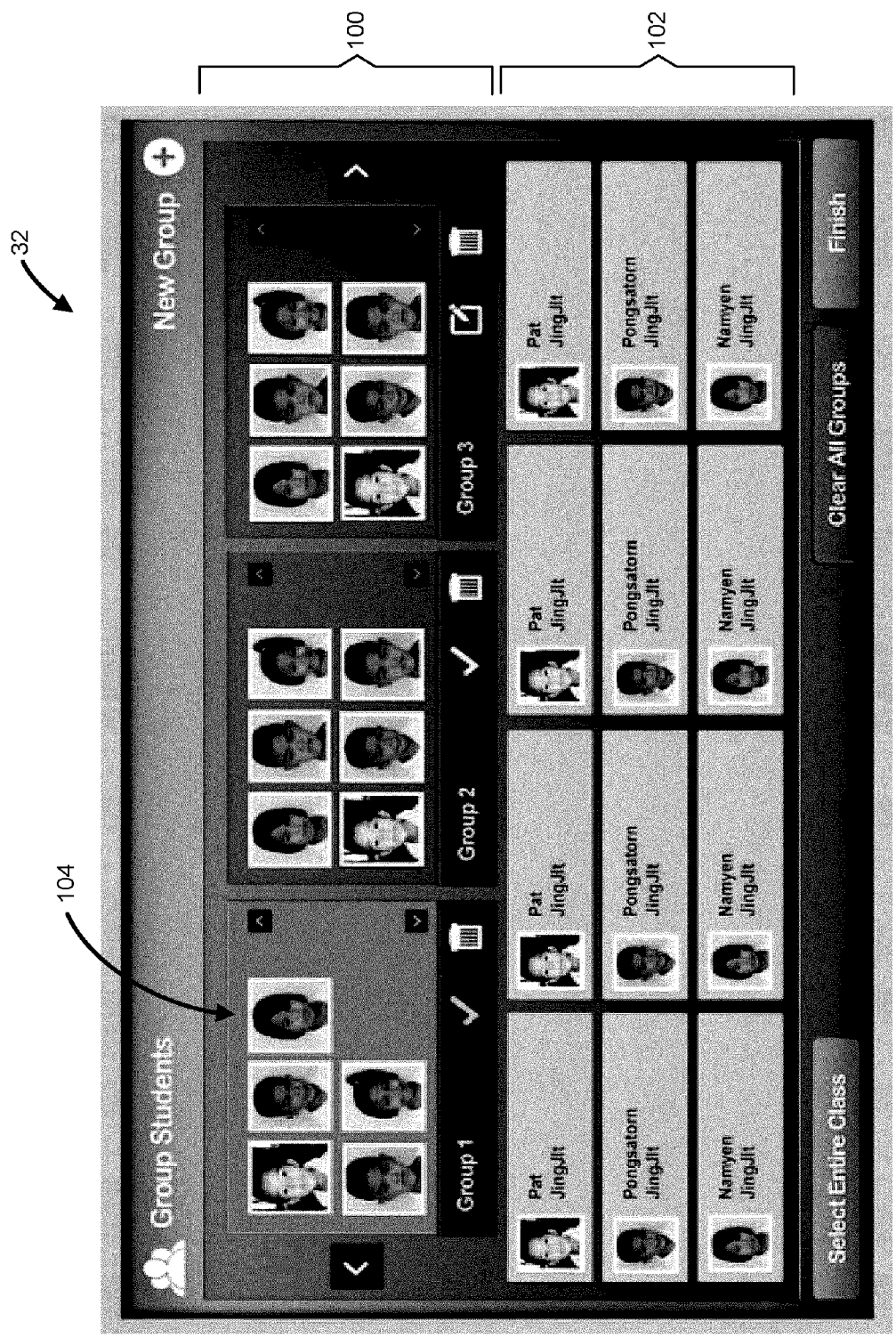
FIG. 9 shows a screen capture of a controlling device interface.

In accordance with an embodiment, with reference to FIGS. 9 and 10, the LSS server is configured to allow teachers to break up a classroom's students into subgroups, allowing them to work on separate group tasks while all within the same classroom. In brief terms, a controlling tablet, once it has locked controllable tablets of a classroom, accesses an additional control screen allowing the teacher, via the controlling tablet, to create subgroups within each class. A screenshot of the control screen is shown in FIG. 9.

The control screen of the user interface 32 is split into two sections 100, 102. The first section 100 (i.e. top half) shows the list of created groups and assigned students within each group, while the second section 102 (i.e. bottom half) shows the list of students within the classroom that have not yet been assigned to a group.

From this screen, a teacher may, via the controlling tablet 22 proceed with any of the following operations:

create a new group within his or her classroom;

drag and drop students into and out of groups by clicking and dragging on the names and profile pictures of students in the same class.

delete a created group, thereby releasing all students within that group into the unassigned area 102;

select a group for synchronization by clicking on the tick (the selected group will be highlighted red as shown at 104); and/or select the entire class for synchronization.

Group assignments for a class persist for the entire life of the classroom, i.e. as long as the classroom exists within the LMS 16, the state of student grouping will continue to exist.

If a group has been selected for locking and/or synchronization, REDIRECT messages will be sent only to that group via the modifications to the Synchronizing Information and Content method as will be better described below. The teacher may return to the control screen 32 at any time and select another group, or to select the entire class for locking and/or synchronization.

In order to allow persistence of group assignment state, a subgroup assignment webservice (SAWS) 106 allows assignment state to be saved and retrieved.

Communication with the server is performed by authenticated controlling tablets via a RESTful request and response protocol. The operations allowed on SAWS 106 are:

Registration of students into Locking Channels (classrooms) (130);

Creation of groups within Locking Channels (classroom groups) (132);

Assignment of students into and out of groups within a Locking Channel (134);

Providing information on group assignments (136).

Controlling tablets 22 will query SAWS 106 upon a first lock operation 116 by the teacher. Controllable tablets 24 will query SAWS 106 once the first classroom-wide LOCK message is received 120 from a controlling tablet 22 to determine the student user's group assignment if it exists within the classroom Locking Channel 52.

Students are grouped and ungrouped within a classroom via an additional set of commands sent through the classroom's Locking Channel 52.

A controllable tablet 24, once it receives 120 a LOCK message on its Locking Channel 52, will check for its group assignment by querying SAWS 106. If it does not belong to a group, it will perform the lock functionality as previously described. However, if it does belong to a group assignment, it will also subscribe to a second Locking Group Channel 108 along with its main Locking Channel 52 which on the LSS 14.

Furthermore, if the controllable tablet 24 belongs to a group, it will also subscribe to REDIRECT messages 120 sent 118 by the controlling tablet 22 on a second Redirect Group Channel 110 along with its main Redirect Channel 55 on the LSS 14.

Commands may be sent from the controlling tablet 22 to its controllable tablets 24 via the main Locking Channel 52. The SETGROUP command 112 is sent by the controlling tablet 22 along with its parameters, a group id and a user id, and is received 124 at a controllable tablet 24 operated by a student user with that user id listening on the Lock Channel 52. The SETGROUP command 124 forces the controllable tablet 24 to subscribe to the Locking Group Channel 108 with that group id. The UNSETGROUP command 114 is sent by the controlling tablet 22 along with a user id parameter, and is received 126 at a controllable tablet 24 operated by a student user with that user id listening on the Lock Channel 52 to unsubscribe from any Locking Group Channels 108 to which it is currently subscribed. SETGROUP and UNSETGROUP commands 112, 114 may only be sent on the main Locking Channel 52, and not on the Locking Group Channel 108, in accordance with the present embodiment.

A controlling tablet 22 will send messages according to the Locking Group Channel 108 or Redirect Group Channel 110 corresponding to the selected group in the group control screen 32, or to the main Locking or Redirect Channel 52, 55 if no groups are selected. Controllable tablets 24 will receive messages on the main Locking or Redirect Channel 52, 55 and on the Locking or Redirect Group Channel 108, 110, it is assigned based on the initial state received from the query to SAWS 106 or on subsequent commands sent via the LSS 14.

Of course, as explained previously, the controlling device 22 does not necessarily need to be located within the same room as the controllable tablets 24, since all communications can be made via internet connections. Students with their tablets may also be dispersed in different locations.

As it can be appreciated, the present system 10 allows for a controlling device 22 to control several computer tablets 24 simultaneously, via a remote server 12. The controlling device 22 is preferably a laptop or desktop, but it can also consist of a computer tablet or smartphone, or any similar device. The controlling device may not only lock the controllable tablets, it can also manage the content to be displayed on the tablets 24.

While the preferred embodiment described herein is especially adapted for a learning management system, it is possible to use such a system for other applications, such as in the field of health care, where a doctor would be provided with the controlling device 22 and nurses or patients would be provided with the controllable tablets 24.

The learning management system 10 illustrated in FIG. 2 (also referred to herein as "tablet management system" or "system") will now be described in other terms.

The learning management system 10 shown in FIG. 2 comprises the controllable devices 24, generally intended for respective students 25. Each controllable device 24 has a user interface 32, a processor 34 for processing input commands received at the user interface 32, and a communication port 36 for communicating via a communication network 40. Each controllable device 24 further comprises a memory 38. Each controllable device 24 is operable in a locked configuration and in an unlocked configuration. The controllable devices 24 are provided by tablet computers, but may alternatively be provided by any suitable general purpose computer, portable computer, Personal digital assistant (PDA), smart phone, mobile phone, and/or the like. The user interface 32 comprises a display screen, which is a touch screen, and may alternatively or additionally comprise a regular display screen, a keyboard, a virtual keyboard, a mouse, a mouse pad, a microphone, a speaker, and/or the like. The communication port 36 enables wireless communication with the server system 12.

The system 10 further comprises a controller device 22 (also referred to in the present by "controlling device" or "controlling tablet"), generally intended for a teacher 23. The controller device 22 has a communication port 46 for sending locking and unlocking command signals, wirelessly, via the communication network 40. The controllable devices 24 may be provided by any suitable general purpose computer, tablet computer, portable computer, PDA, smart phone, mobile phone, and/or the like, and further comprises a user interface 42, a processor 44 and a memory 48.

With further reference to FIG. 3, the system 10 further comprises a server system 12 for interpreting and handling communications between the controllable devices 24 and the controller device 22. More particularly, the server system 12 receives 70 the locking command signal 68 from the controller device 24, and sends in response thereto, a corresponding locking control signal 72 to operate each of the controllable devices 24 simultaneously in said locked configuration in which the user interface 32 of the controllable device 24 is controlled by the controller device 22.

In some embodiments, in the locked configuration, the user interface 32 is controlled by the controller device 22 to present learning content restricted by the controller device 22, for example a particular webpage, a particular course content, a particular lesson and/or the like, which may be provided as static readable data, or in the form of an exercise or test capable or receiving student input. The controllable device still provides some user interface control to a user, i.e. a student 25 (see FIG. 2), in that the student may scroll within the content and/or input information within the present learning content. In an example where the restricted content includes video or other recorded content, the controllable device may enable the student, in the locked configuration, to still navigate within the recorded content. Still in another example where the restricted content includes several interlinked pages, the student may be enabled, in the locked configuration, to still navigate within those pages. Thus, in the locked configuration, the processing of input commands by the processor 34 at the controllable devices 24 is restricted to respond to input commands related to the restricted learning content, in order to prevent the user of the controllable device from consuming data beyond the restricted learning content.

Figure 5:
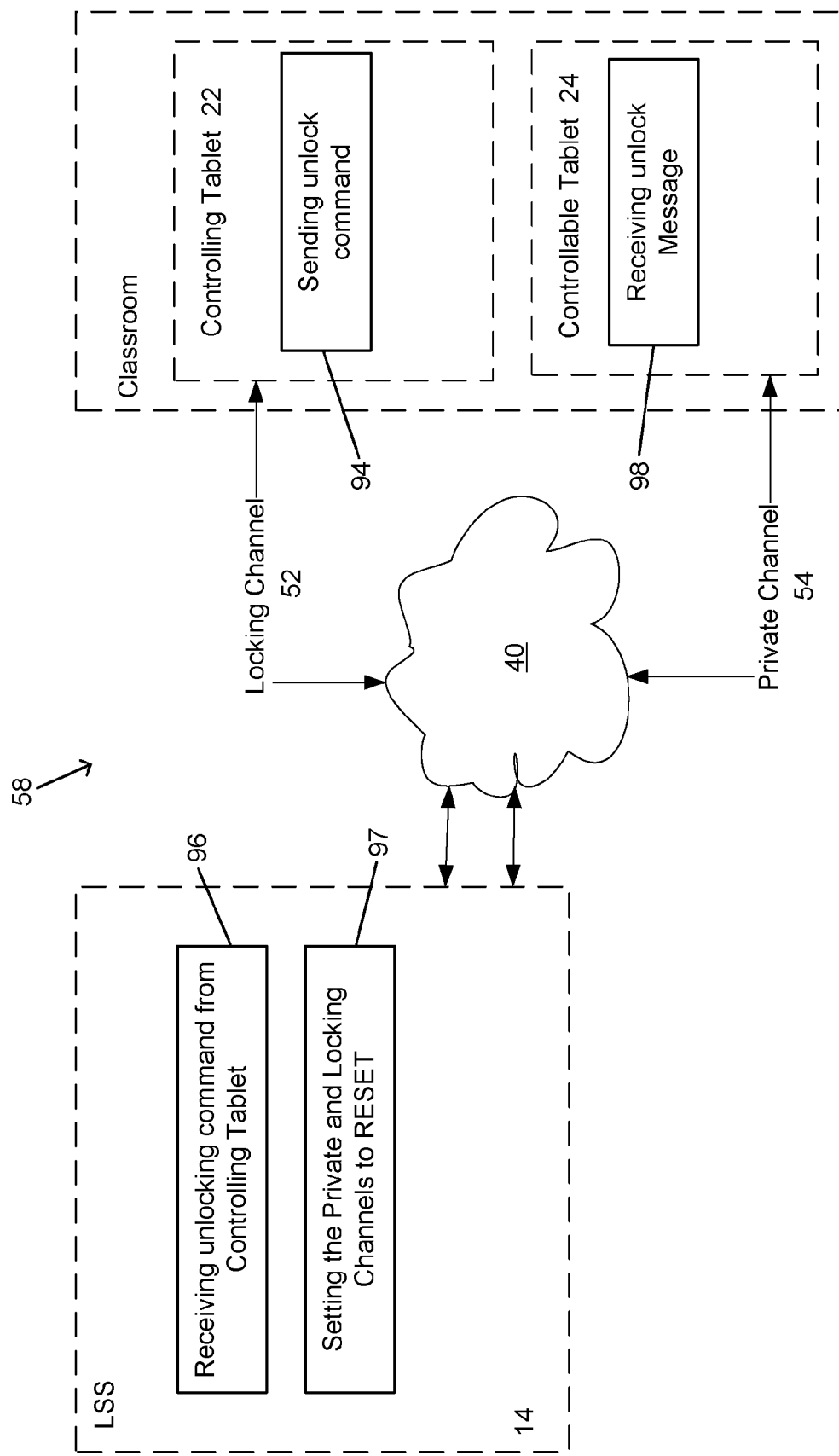
FIG. 5 is a block diagram of the unlocking process, according to the first embodiment of the invention.

Moreover, with further reference to FIG. 5, the server system 12 receives 96 the unlocking command signal 94 from the controller device 22, and sends in response thereto, a corresponding unlocking control signal 97 to operate each of the controllable devices 24 from said locked configuration to the unlocked configuration 98 wherein the user interface is operable independently of the controller device, i.e. the controllable devices 24 are disengaged from the controller device 22.

The server system 12 may be provided by a plurality of servers which cooperate together to operate the system. Alternatively, the server system 12 may be provided by a single server. The server system 12 may be located on site (in the classroom or near the controller device 22, for example) or it may be located remotely from the devices 22, 24.

In the embodiment shown in FIG. 2, the server system 12 comprises cloud-based clustered servers, including the Locking and Synchronization System (LSS) 14 for managing locking and unlocking of the controllable devices 24 by the controller device 22, and further including the Learning Management System (LMS) server 16 for managing authentication rights of users associated to the controllable devices 24 and for managing content to be distributed to the controllable devices 24. The cloud-based clustered servers 12 preferably include other servers represented by 18, for storing, managing statistical information, student information and/or the like. The LMS 16 server comprises an administrative interface accessible via the Internet.

The learning management system 10 further comprises a database 20 for storing the content to be distributed, the database being in communication with the server system 12.

It is to be understood that the communication between the server system 12 and the different components of the system 10 (controller devices 22, the controllable devices 24, the database 20) may each be handled over different communication networks, in accordance with embodiments of the present, as a skilled reader would understand.

The term "communication network" refers to any suitable communication means and may be provided by a wide area network (WAN) such as the Internet, a local area network (LAN), a cable connection, a wireless connection, a data network, a telephone network, and/or the like.

It is to be understood that the system may comprises a plurality of controller devices 22 which cooperate to control a same group of controllable devices 24. Moreover, a plurality of controller devices 22 may be provided, each being associated to distinct groups of controllable devices 24, i.e. different smart classrooms. Still alternatively, a same controller device 22 may operate for a given set of controllable devices 24 at a given time, and with one or more other sets at other times.

Operational features of the learning management system 10 will now be described in other terms, with reference to FIGS. 3 to 5, in accordance with the first embodiment.

A method 50 of authenticating and locking is shown in FIG. 3. Upon receiving an authentication request 60 from one of the controllable devices 24, the LSS server 14 connects the controllable device 24 to the LSS server 14 via a corresponding Private Channel 54 and sets a default state on the Private Channel 54, i.e. send a RESET message on the Private Channel 52, as shown at bloc 62.

Upon receiving an authentication request 64 from the controller devices 22, the LSS server 14 connects the controller device 22 to the LSS server 14 via the Locking Channel 52 and sets a default state on the Locking Channel 52, i.e. send a RESET message on the Locking Channel 52, as shown at bloc 66.

When the LSS server 14 (a) receives 70 a locking command signal 68 from the controller device 22, the LSS server 14 (b) processes the locking command signal 68 and sends a corresponding locking control signal to controllable devices 24. More particularly, the LSS server 14 sends a SUBSCRIBE message 72 on the private channels 54 to force each controllable device to subscribe to the locking channel; and then sends a LOCK message 78 on the locking channel 52 to be received 80 by the respective controllable devices 24, in order to simultaneously operate each of the controllable devices 24 in the locked configuration.

A method 56 of synchronizing the controllable device 24 with the controller device 22 is shown in FIG. 4. When the controllable devices 24 are in the locked configuration, the learning content to be distributed to the controllable devices 24 is selected 82 at the controller device 22, which is then synchronized with the controllable devices 24 to force the controllable devices 24 to load the selected learning content. More particularly, the synchronizing comprises receiving 86 at the LSS server 14 a content identifier being associated to the learning content having been selected and having been sent 84 by the controller device 22; and upon receiving a synchronize command signal 88 from the controller device 22, sending 90 a REDIRECT message and the content identifier on the locking channel 52, in order to present 92, on the user interface of each controllable device 24, the selected learning content based on the content identifier.

The steps for unlocking 58 the controllable devices 24 is shown in FIG. 5. The controller device 22 sends 94 an unlocking command signal which is received 96 at the LSS server 14. In response thereto, the LSS server 14 sets 97 the Private and Locking Channels 52, 54 to a default status, i.e. by sending a RESET message which is received 98 at the controllable devices 24, in order to operate simultaneously each of the controllable devices from the locked configuration to the unlocked configuration wherein the user interface is operable independently of the controller device.

Operational features of the system will now be described in accordance with the second embodiment, with reference to FIGS. 6 to 8.

With reference to FIG. 6 which illustrates the method 50 of authenticating and locking, upon receiving an authentication request 60 from one of the controllable devices 24, the LSS server 14 connects the controllable device 24 to the LSS server 14 on the Locking Channel 52 requested by the controllable device 24, depending on the enrollment status of the student using the controllable device 24 as specified on the LMS 16.

Upon receiving an authentication request 64 from the controller devices 22, the LSS server 14 connects the controller device 22 to the LSS server 14 via the Locking Channel 52 and sets a default state on the Locking Channel 52, i.e. send a RESET message on the Locking Channel 52, as shown at bloc 66.

When the LSS server 14 (*a*) receives 70 a locking command signal 68 from the controller device 22, the LSS server 14 (*b*) processes the locking command signal 68 and sends a corresponding locking control signal to controllable devices 24. More particularly, the LSS server 14 sends a LOCK message 78 on the locking channel 52 to be received 80 by the respective controllable devices 24, in order to simultaneously operate each of the controllable devices 24 in the locked configuration.

A method 56 of synchronizing the controllable device 24 with the controller device 22, in the context of the second embodiment is shown in FIG. 7. When the controllable devices 24 are in the locked configuration, the learning content to be distributed to the controllable devices 24 is selected 82 at the controller device 22, which is then synchronized with the controllable devices 24 to force the controllable devices 24 to load the selected learning content. More particularly, the synchronizing comprises receiving 86 at the LSS server 14 a content identifier being associated to the learning content having been selected and having been sent 84 by the controller device 22; and upon receiving a synchronize command signal 88 from the controller device 22, sending 90 a REDIRECT message and the content identifier on the redirect channel 54, in order to present 92, on the user interface of each controllable device 24, the selected learning content based on the content identifier.

Figure 8:
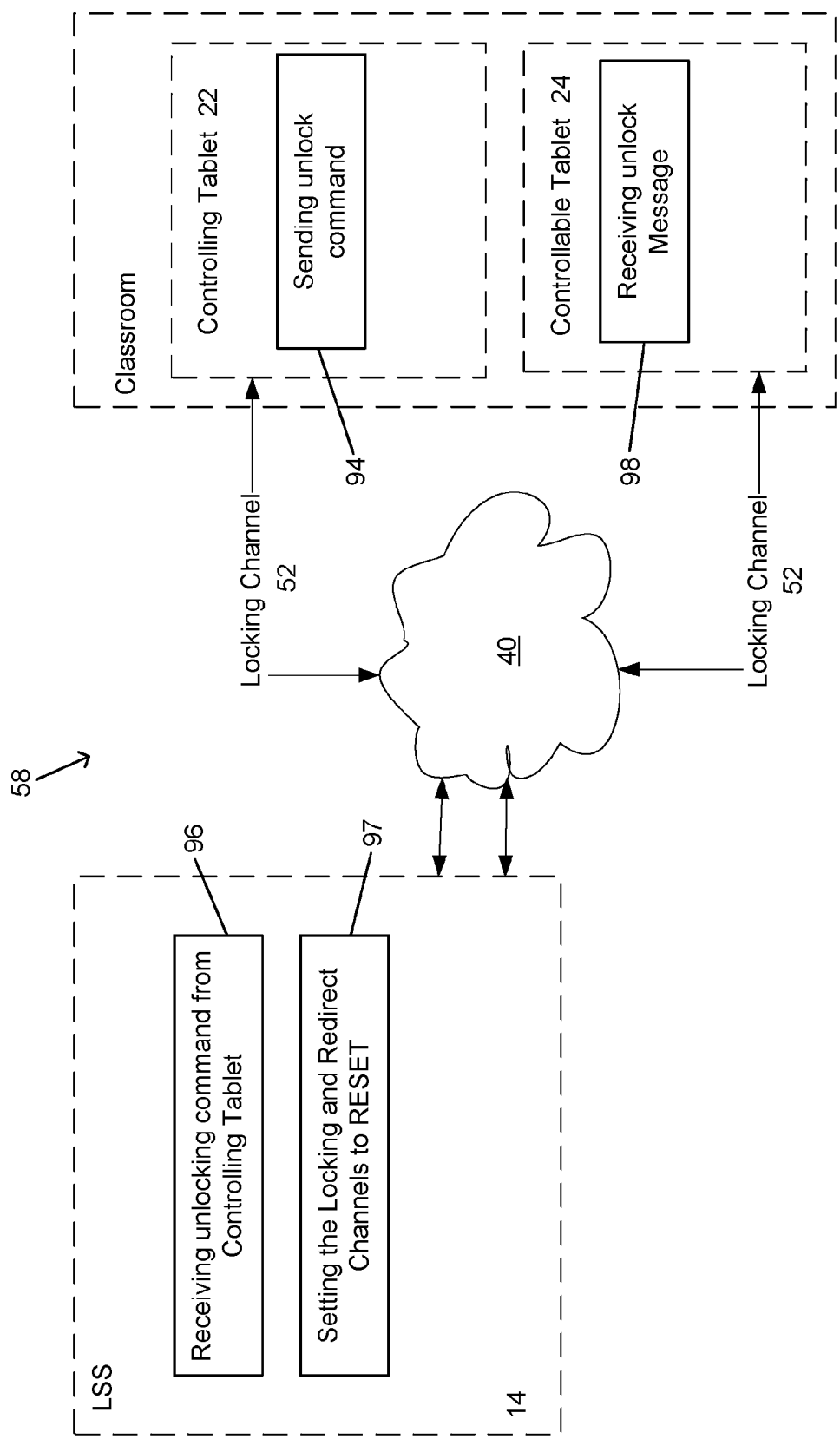
FIG. 8 is a block diagram of the unlocking process, according to the second embodiment of the invention.

With reference to FIG. 8 which illustrates the method of unlocking 58, the controller device 22 sends 94 an unlocking command signal which is received 96 at the LSS server 14. In response thereto, the LSS server 14 sets 97 the Locking Channel 52 to a default status, i.e. by sending a RESET message which is received 98 at the controllable devices 24, in order to operate simultaneously each of the controllable devices from the locked configuration to the unlocked configuration wherein the user interface is operable independently of the controller device.

VARIOUS OPTIONAL SCENARIOS AND EXAMPLES

Various optional scenarios and examples of the system, the method, and features thereof will be described below. It should be understood that the scenarios described below may be combined with other aspects of the learning management system as described hereinabove, or with features thereof, in accordance with various embodiments of the present invention.

According to some scenarios, there is provided a learning management system comprising: controllable devices, each having a user interface, a processor for processing input commands received at the user interface, and a communication port for communicating via a communication network, each controllable device being operable in a locked configuration and in an unlocked configuration; and a controller device having a communication port: for sending a locking command signal to the controllable devices via the communication network, in order to operate each of the controllable devices in said locked configuration wherein the user interface is controlled to present learning content restricted by the controller device and wherein the processor is restricted to respond to input commands related to the restricted learning content; and for further sending an unlocking command signal to the controllable devices via a communication network, in order to operate each of the controllable devices from said locked configuration to the unlocked configuration wherein the user interface is operable independently of the controller device. An input command may be defined as a user input or user command entered at the controllable device, and preferably includes a scrolling command to allow independent scrolling at each device within the viewable learning content, and may also include editing, for example filing out an exercise or test. In other words, in the locked configuration, the user interface is responsive to user commands performed within the restricted learning content. Preferably, at least one or more of said controllable devices and of said controller device is provided by a tablet computer.

According to another scenario, there is provided a method of operating a learning management system comprising: (a) sending a locking command signal to controllable devices in order to operate each of the controllable devices in said locked configuration wherein a user interface of each controllable device is controlled to present learning content restricted by a controller device and wherein the processor is restricted to respond to input commands related to the restricted learning content. The method further comprises (b) sending an unlocking command signal to controllable devices in order to operate each of the controllable devices in said unlocked configuration wherein the user interface is operable independently of the controller device. Preferably, the user interface of each controllable device comprises a display screen, the learning content being displayed on the display screen, and wherein the input commands related to the restricted learning content include scrolling within the learning content displayed.

According to yet another scenario, there is provided a non-transitory storage medium comprising processor-readable data and instructions for sending a locking command signal to controllable devices in order to operate each of the controllable devices in said locked configuration wherein a user interface of each controllable device is controlled to present learning content restricted by a controller device and wherein the processor is restricted to respond to input commands related to the restricted learning content. The non-transitory storage medium further comprises processor-readable data and instructions for sending an unlocking command signal to controllable devices in order to operate each of the controllable devices in said unlocked configuration wherein the user interface is operable independently of the controller device.

According to another scenario, there is provided a tablet management system. The system comprises:
- at least one server with authenticating and administrative capabilities;
- several controllable tablets, each provided with a processor, a memory, a touchscreen for displaying an interface, and wireless connection capabilities for communicating with said at least one server, and
- a controlling device provided with a processor, a memory, a screen for displaying a controlling interface, and wireless connection capabilities for communicating with said at least one server,
- the server being able to authenticate the controlling device and controllable tablets, and the controller device being adapted to control simultaneously the controllable tablets through the controllable interface.

In one embodiment, the tablet management system is a learning management system.

In one embodiment of the system, the controlling device controls the controllable tablets via the server.

In one embodiment, the controlling device is one of: a tablet, a laptop, a desktop, or any other device able to access the at least one server through a secure web interface.

In one embodiment, the controlling interface is a webpage accessible through a web browser, while in another embodiment, the controlling interface is an application stored within the controlling PC or tablet memory.

In one embodiment of the system, the controlling device comprises means for locking and/or synchronizing the tablets.

In one embodiment of the system, the at least one server comprises several cloud-based clustered servers.

In one embodiment of the system, the cloud-based clustered servers include a Locking and Synchronization System (LSS) and Learning Management System (LMS) server.

In one embodiment of the system, the tablets include web-browsing capabilities.

In one embodiment of the system, the tablets include an application for displaying and interacting with learning content stored on the at least one server.

In one embodiment, the authenticating capabilities allow creating a locking channel with the controller tablet and a private channel with each of the controllable tablet.

In an alternate embodiment, the authenticating capabilities allow creating a locking channel with the controller tablet and a redirect channel with each of the controllable tablet.

According to still another scenario, a method for managing several tablets simultaneously is provided. The method comprises the steps of:
- Providing a Learning Management System including at least one server, a controlling device, and several controllable tablets;
- Establishing communication between each of the tablets, the controlling device and the server, and authenticating the controlling device and controllable tablets as such,
- Upon receiving a lock command by the controlling device, simultaneously locking the controllable tablets.

In one embodiment, the method further comprises a step of synchronizing learning content to be displayed on the controllable tablets.

Although preferred embodiments of the present invention have been described in detail herein and illustrated in the accompanying drawings, it is to be understood that the invention is not limited to these precise embodiments and that various changes and modifications may be effected therein without departing from the present invention.

The invention claimed is:

1. A learning management system using Representational State Transfer (REST), the system comprising:
   - controllable devices, each having a user interface, a processor for processing input commands received at the user interface, and a communication port for communicating via a communication network, each of the controllable devices being configured to selectively operate in a locked configuration and in an unlocked configuration;
   - a controller device having a communication port for sending locking and unlocking command signals via the communication network; and
   - a server system for interpreting and handling communications between the controllable devices and the controller device, in order to:
     - receive the locking command signal from the controller device, and send in response thereto, a corresponding locking control signal to operate each of the controllable devices simultaneously in said locked configuration wherein the user interface of each of the controllable devices is controlled by the controller device while permitting user control at each of the controllable devices, wherein the permitting user control at the controllable device comprise permitting scrolling within restricted learning content; and
     - receive the unlocking command signal from the controller device, and send in response thereto, a corresponding unlocking control signal to operate each of the controllable devices from said locked configuration to the unlocked configuration wherein the user interface of each of the controllable devices is configured to be operated independently of the controller device;
   - wherein the server system is configured for, prior to receiving the locking command signal from the controller device:
     - authenticating the controllable devices and the controller device, wherein the authenticating includes connecting the controller device to the server system via a locking channel, and connecting each of the controllable devices to the server system via a corresponding private channel, so as to subscribe each of the controllable devices to messages directed to each of the controllable devices;
     - setting a default state on the locking channel;
     - setting a default state on the corresponding private channel for each of the controllable devices;
     - sending a corresponding SUBSCRIBE message on the corresponding private channel for each of the controllable devices to force each of the controllable devices to subscribe to the locking channel; and
     - sending a LOCK message on the locking channel in order to operate each of the controllable devices in the locked configuration.

2. The learning management system according to claim 1, wherein the server system comprises cloud-based clustered servers.

3. The learning management system according to claim 1, wherein the server system comprises a Locking and Synchronization System (LSS) for managing locking and unlocking each of the controllable devices by the controller device.

4. The learning management system according to claim 1, wherein the server system comprises a Learning Management System (LMS) server for managing authentication rights of users associated to the controllable devices and for managing content to be distributed to the controllable devices.

5. The learning management system according to claim 4, wherein the Learning Management System (LMS) server comprises an administrative interface accessible via the Internet.

6. The learning management system according to claim 1, further comprising a database for storing the content to be distributed, the database being in communication with the server system.

7. The learning management system according to claim 1, wherein at least one or more of said controllable devices and of said controller device is provided by a tablet computer.

8. The system of claim 1, wherein each of the controllable devices is configured to receive selection of the restricted learning content; and
   wherein, in said locked configuration, the user interface of each of the controllable devices is controlled to display the restricted learning content.

9. The system of claim 8, wherein, in said locked configuration, the user interface of each of the controllable devices is controlled to prevent consuming data beyond the restricted learning content.

10. The system of claim 8, wherein permitting user control comprises at least one of permitting scrolling within the restricted learning content and permitting inputting information within the restricted learning content.

11. The system of claim 8, wherein the restricted learning content comprises a set of interlinked pages and wherein permitting user control comprises permitting navigating within the interlinked pages.

12. A method of operating a learning management system using Representational State Transfer (REST), the method comprising:
   a) receiving, at a server system, a locking command signal from a controller device; and
   b) processing, at the server system, the locking command signal and sending a corresponding locking control signal to controllable devices in order to simultaneously operate each of the controllable devices in a locked configuration wherein a user interface of each controllable device is controlled by the controller device while permitting user control at each of the controllable devices, wherein the permitting user control at the controllable devices comprises scrolling within restricted learning content; and
   wherein the method further comprises prior to step (a):
      authenticating the controllable devices and the controller device, the authenticating including connecting the controller device to the server system via a locking channel, and connecting each of the controllable devices to the server system via a corresponding private channel of a plurality of private channels, so as to subscribe each of the controllable devices to messages directed to corresponding subscribed controllable device;
      setting a default state on the locking channel;
      setting a default state on the plurality of private channels; and
   wherein step (b) comprises, at the server system:
      sending a corresponding SUBSCRIBE message on the plurality of private channels to force each of the controllable devices to subscribe to the locking channel; and
      sending a LOCK message on the locking channel in order to operate each of the controllable devices in the locked configuration.

13. The method according to claim 12, further comprising:
   c) receiving an unlocking command signal from the controller device; and
   d) processing the unlocking command signal and sending a corresponding unlocking control signal to each of the controllable devices in order to operate simultaneously each of the controllable devices from the locked configuration to the unlocked configuration wherein the user interface of each of the controllable devices is configured to be operated independently of the controller device.

14. The method according to claim 13, further comprising, when the controllable devices are in the locked configuration:
   selecting, at the controller device, the restricted learning content to be distributed to each of the controllable devices; and
   synchronizing the controller device with each of the controllable devices to force each of the controllable devices to load the selected restricted learning content.

15. The method according to claim 14, wherein the synchronizing comprises, at the server system:
   receiving a content identifier being associated to the restricted learning content having been selected; and
   upon receiving a synchronize command signal from the controller device, sending a REDIRECT message and the content identifier on the locking channel, in order to present, on the user interface of each of the controllable devices, the selected restricted learning content based on the content identifier.

16. The method according to claim 15, wherein the locked configuration of each of the controllable devices restricts responding to input commands related to the restricted learning content.

17. The method of claim 12, wherein each of the controllable devices is configured to receive selection of restricted learning content;
   wherein, in said locked configuration, the user interface of each of the controllable devices is controlled to display the restricted learning content.

18. The method of claim 17, wherein, in said locked configuration, the user interface of each of the controllable devices is controlled to prevent consuming data beyond the restricted learning content.

19. The method of claim 17, wherein permitting user control comprises at least one of permitting scrolling within the restricted learning content and permitting inputting information within the restricted learning content.

20. The method of claim 17, wherein the restricted learning content comprises a set of interlinked pages and wherein permitting user control comprises permitting navigating within the interlinked pages.

* * * * *